United States Patent
Seo et al.

(10) Patent No.: US 9,979,201 B2
(45) Date of Patent: May 22, 2018

(54) COMPONENT FOR A NETWORK SYSTEM INCLUDING A POWER SAVING FUNCTION

(75) Inventors: Moonseok Seo, Seoul (KR); Junho Ahn, Seoul (KR); Daegeun Seo, Seoul (KR); Dalho Cheong, Seoul (KR); Joongkeun Lee, Seoul (KR); Bongmun Jang, Seoul (KR); Hyunjung Kwak, Seoul (KR); Yanghwan Kim, Seoul (KR); Sangwook Seo, Seoul (KR); Hoonbong Lee, Seoul (KR); Koonseok Lee, Seoul (KR); Kuyoung Son, Seoul (KR); Kyungeun Jo, Seoul (KR); Sangil Hwang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 851 days.

(21) Appl. No.: 13/806,551

(22) PCT Filed: Jun. 22, 2011

(86) PCT No.: PCT/KR2011/004577
§ 371 (c)(1),
(2), (4) Date: May 14, 2013

(87) PCT Pub. No.: WO2011/162555
PCT Pub. Date: Dec. 29, 2011

(65) Prior Publication Data
US 2013/0332002 A1 Dec. 12, 2013

(30) Foreign Application Priority Data

Jun. 26, 2010 (KR) .......................... 10-2010-0060887
Jul. 16, 2010 (KR) .......................... 10-2010-0069194

(Continued)

(51) Int. Cl.
*G06F 1/32* (2006.01)
*H02J 3/14* (2006.01)
(Continued)

(52) U.S. Cl.
CPC ............ *H02J 4/00* (2013.01); *A47L 15/0047* (2013.01); *A47L 15/0063* (2013.01);
(Continued)

(58) Field of Classification Search
None
See application file for complete search history.

(56) References Cited

U.S. PATENT DOCUMENTS 5,059,762 A * 10/1991 Simcock .................. H05B 6/36
                                                        219/662
5,128,938 A *  7/1992 Borras ................. G08B 3/1066
                                                        340/7.28
(Continued)

FOREIGN PATENT DOCUMENTS

JP       11-295358 A   10/1999
JP     2001-257498 A    9/2001
(Continued)

*Primary Examiner* — Robert Fennema
*Assistant Examiner* — Jay Jung
(74) *Attorney, Agent, or Firm* — Dentons US LLP

(57) ABSTRACT

Provided is a component for a network system. The component for a network system which is communicable with the other component includes a communication unit for communicating with the other component, an input part for inputting a command related to an operation of the component, and a control part for controlling the operation of the component. The component includes a power saving function in which the component is operable on the basis of energy information.

21 Claims, 35 Drawing Sheets

(30) Foreign Application Priority Data

Jul. 27, 2010 (KR) .................. 10-2010-0072167
Nov. 26, 2010 (WO) .................. PCT/IB2010/003388
Dec. 15, 2010 (KR) .................. 10-2010-0128416

(51) Int. Cl.

| | | |
|---|---|---|
| *H02J 4/00* | (2006.01) | |
| *A47L 15/00* | (2006.01) | |
| *D06F 33/02* | (2006.01) | |
| *H02J 13/00* | (2006.01) | |
| *D06F 39/00* | (2006.01) | |

(52) U.S. Cl.
CPC ............... *D06F 33/02* (2013.01); *H02J 3/14* (2013.01); *H02J 13/0079* (2013.01); *A47L 2401/30* (2013.01); *A47L 2401/34* (2013.01); *D06F 39/005* (2013.01); *D06F 2202/12* (2013.01); *D06F 2204/10* (2013.01); *D06F 2212/02* (2013.01); *H02J 2003/143* (2013.01); *H02J 2003/146* (2013.01); *Y02B 70/3225* (2013.01); *Y02B 70/3266* (2013.01); *Y04S 20/222* (2013.01); *Y04S 20/224* (2013.01); *Y04S 20/242* (2013.01)

(56) References Cited

U.S. PATENT DOCUMENTS

| | | | |
|---|---|---|---|
| 6,456,674 B1* | 9/2002 | Horst .................. | H04L 1/02 246/187 A |
| 2003/0050737 A1* | 3/2003 | Osann, Jr. ............ | G05B 15/02 700/276 |
| 2003/0171851 A1* | 9/2003 | Brickfield ............ | H02J 3/008 700/286 |
| 2003/0178894 A1 | 9/2003 | Ghent | |
| 2005/0108441 A1* | 5/2005 | Wang .................. | G06F 1/3293 710/1 |
| 2005/0125083 A1* | 6/2005 | Kiko .................. | G05B 15/02 700/19 |
| 2007/0028198 A1* | 2/2007 | New .................. | G06F 17/5045 716/105 |
| 2007/0289607 A1* | 12/2007 | Kim .................. | D06F 35/006 134/18 |
| 2008/0039979 A1* | 2/2008 | Bridges .............. | B60L 11/1816 700/292 |
| 2008/0109867 A1* | 5/2008 | Panabaker ............ | H04W 12/08 726/1 |
| 2008/0122585 A1* | 5/2008 | Castaldo .............. | G06F 9/54 340/286.01 |
| 2008/0167756 A1* | 7/2008 | Golden ................ | G05B 15/02 700/297 |
| 2008/0177678 A1* | 7/2008 | Di Martini ............ | G01D 4/002 705/412 |
| 2009/0187499 A1* | 7/2009 | Mulder ................ | G05B 15/02 705/30 |
| 2009/0211111 A1* | 8/2009 | Kim .................. | D06F 58/263 34/526 |
| 2009/0287359 A1* | 11/2009 | Kulyk ................ | H02J 3/14 700/296 |
| 2009/0295594 A1* | 12/2009 | Yoon .................. | G06Q 30/0202 340/6.1 |
| 2010/0179704 A1* | 7/2010 | Ozog ................ | G06Q 10/06315 700/291 |
| 2010/0179708 A1* | 7/2010 | Watson ................ | G06Q 50/06 700/296 |
| 2010/0194524 A1* | 8/2010 | Campero .............. | G05B 15/02 340/3.1 |
| 2010/0217550 A1* | 8/2010 | Crabtree .............. | H02J 13/0079 702/62 |
| 2010/0217651 A1* | 8/2010 | Crabtree .............. | G06Q 10/00 705/7.22 |
| 2010/0222935 A1* | 9/2010 | Forbes, Jr. ............ | G06Q 10/00 700/291 |
| 2010/0241888 A1* | 9/2010 | Kaneko ................ | G06F 1/3203 713/324 |
| 2010/0257224 A1* | 10/2010 | Tobita ................ | G06F 8/61 709/202 |
| 2010/0262313 A1* | 10/2010 | Chambers ............ | G06Q 10/04 700/295 |
| 2010/0318825 A1* | 12/2010 | Fulkerson ............ | G06F 1/3203 713/323 |
| 2011/0015797 A1* | 1/2011 | Gilstrap .............. | G05B 15/02 700/291 |
| 2011/0153090 A1* | 6/2011 | Besore ................ | G05B 15/02 700/278 |
| 2011/0153100 A1* | 6/2011 | Besore ................ | G06Q 10/0631 700/291 |
| 2011/0153101 A1* | 6/2011 | Thomas .............. | G06Q 10/04 700/291 |
| 2011/0153110 A1* | 6/2011 | Drake ................ | A47L 15/0047 700/296 |
| 2011/0185511 A1* | 8/2011 | Ryoo .................. | D06F 29/00 8/137 |
| 2011/0251732 A1* | 10/2011 | Schweitzer, III ...... | H02J 3/12 700/297 |
| 2015/0358175 A1* | 12/2015 | Lee .................. | H04L 12/2816 700/275 |

FOREIGN PATENT DOCUMENTS

| | | |
|---|---|---|
| JP | 2002-051462 A | 2/2002 |
| KR | 100285837 B1 | 1/2001 |
| KR | 10-2001-0093569 A | 10/2001 |
| KR | 10-2002-0041928 A | 6/2002 |
| KR | 10-2003-0036286 A | 5/2003 |
| KR | 100701110 B1 | 3/2007 |
| KR | 10-2007-0062006 A | 6/2007 |
| KR | 10-2008-0107939 A | 12/2008 |
| KR | 10-2009-0012521 A | 2/2009 |
| WO | 2010/031027 A2 | 3/2010 |

\* cited by examiner

COMPONENT FOR A NETWORK SYSTEM INCLUDING A POWER SAVING FUNCTION

This application claims the benefit of priority of PCT/KR2011/004577 filed on Jun. 22, 2011, which claims priority of Korean Application No. 10-2010-0060887 filed on Jun. 26, 2010, Korean Application No. 10-2010-0069194 filed on Jul. 16, 2010, Korean Application No. 10-2010-0072167 filed on Jul. 27, 2010, Korean Application No. 10-2010-0128416 filed on Dec. 15, 2010 and PCT/IB/2010/003388 filed on Nov. 26, 2010, all of which are incorporated by reference in their entirety herein.

BACKGROUND

The present disclosure relates to a component for a network system.

Providers simply provide energy sources such as electricity, water, and gas, and consumers simply use the supplied energy sources. This makes it difficult to effectively manage the production, distribution and use of energy. Therefore, a network system for effectively managing energy is in need.

SUMMARY

Embodiments provide a component for a network system which can effectively manage an energy source.

In one embodiment, a component for a network system which is communicable with the other component includes: a communication unit for communicating with the other component; an input part for inputting a command related to an operation of the component; and a control part for controlling the operation of the component, wherein the component includes a power saving function in which the component is operable on the basis of energy information.

The details of one or more embodiments are set forth in the accompanying drawings and the description below. Other features will be apparent from the description and drawings, and from the claims.

DETAILED DESCRIPTION OF THE EMBODIMENTS

Reference will now be made in detail to the embodiments of the present disclosure, examples of which are illustrated in the accompanying drawings.

Figure 1:
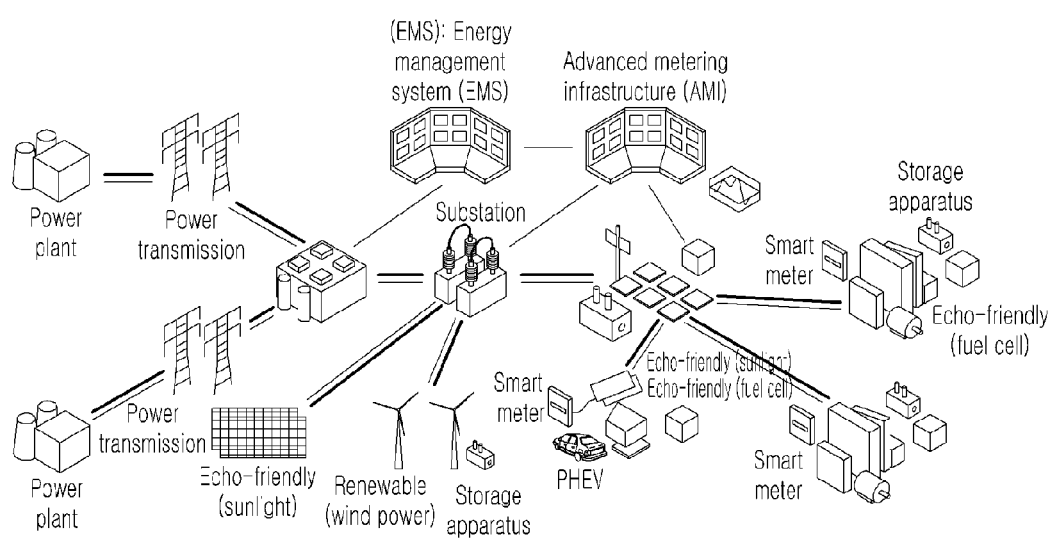
FIG. 1 is a view schematically showing an example of a network system according to the present disclosure.

FIG. 1 is a view schematically showing an example of a network system according to the present disclosure.

The network system is a system for managing an energy source such as electricity, water or gas. The energy source means one of which amount generated or used can be metered. Therefore, even a source not mentioned above may be used as the energy source. Hereinafter, electricity will be described as an example of the energy source, and details of this specification may be identically applied to other energy sources.

Referring to FIG. 1, a network system according to an embodiment includes a power plant for producing electricity. The power plant may include a power plant for producing electricity through a thermal power generation or nuclear power generation and a power plant using water power, sunlight power, wind power or the like which is eco-friendly energy.

The electricity produced in the power plant is transmitted to a sub-control center through a power transmission line, and the sub-control center transmits the electricity to a substation so that the electricity is distributed to customers such as houses or offices.

Electricity produced by the eco-friendly energy is also transmitted to the substation so as to be distributed to each of the customers. The electricity transmitted from the substation is distributed to each of the offices or houses through electricity power storage, or is directly distributed to each of the offices or houses.

In a house using a home area network (HAN), electricity may be produced by itself through sunlight, fuel cells built in a plug-in hybrid electric vehicle (PHEV), or the like. Also, the produced electricity may be stored or distributed, or surplus electricity may be resold to the outside world.

The network system may include a smart meter for detecting the amount of electricity used in each customer (house, office or the like) in real time, and an advanced metering infrastructure (AMI) for metering the amount of electricity used in a plurality of customers.

The network system may further include an energy management system (EMS) for managing energy. The EMS may generate information on operations of one or more components with respect to energy (production of energy, distribution of energy, usage of energy, storage of energy, and the like). The EMS may generate at least a command for the operations of the components.

In this specification, a function or solution performed by the EMS may be referred to as an energy management function or energy management solution.

In the network system, one or more EMSs may be provided as a separate configuration, or the EMS may be included as an energy management function or energy management solution in one or more components.

Figure 2:
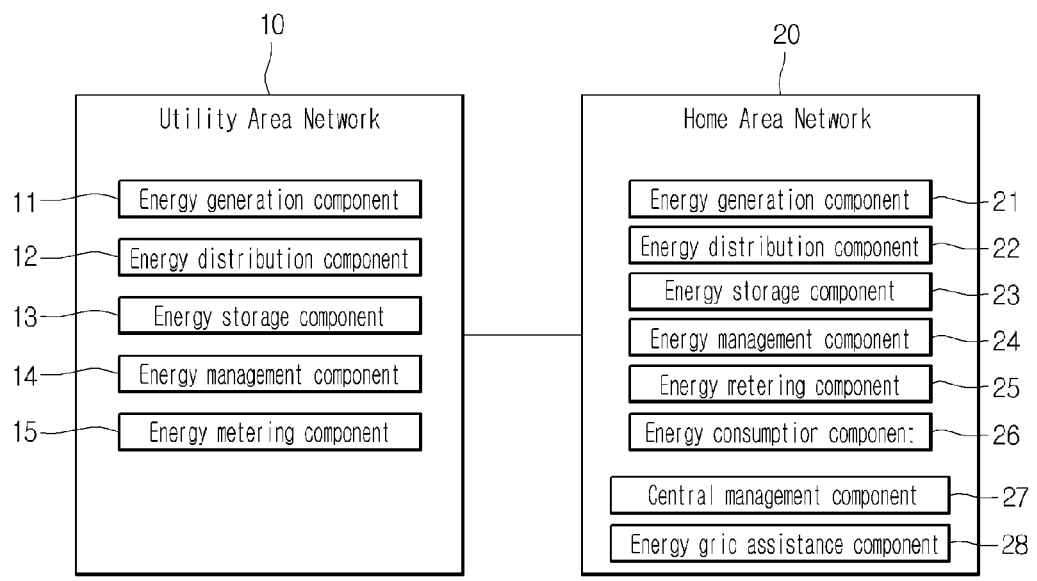
FIG. 2 is a block diagram schematically showing an example of the network system according to the present disclosure.

FIG. 2 is a block diagram schematically showing an example of the network system according to the present disclosure.

Referring to FIGS. 1 and 2, the network system according to the present disclosure is configured by a plurality of components. For example, the components of the network system are a power plant, a substation, a sub-control center, an EMS, electric home appliances, a smart meter, a storage battery, a web server, an AMI, a home server, and the like.

In the present disclosure, each of the components may be configured by a plurality of sub-components. As an example, in a case of one component is an electric home appliance, sub-components may be a microcomputer (MICOM), a heater, a display and the like. That is, all that perform a specific function may be components in the present disclosure, and such components constitute the network system of the present disclosure. Two components may communicate with each other by means of a communication unit. One network may be one component or may be configured by a plurality of components.

In this specification, the network system in which communication information is related to an energy source may be referred to as an energy grid.

A network system according to an embodiment may include a utility area network (UAN) 10 and a home area network (HAN) 20. The UAN 10 and the HAN 20 may perform wired or wireless communication by means of a communication unit, and may perform two-way communication.

In this specification, the term "home" means not only a household as a lexical meaning but also a group in which specific components such as buildings or companies gather. Also, the term "utility" means a group in which specific components outside the home gather.

The UAN 10 includes an energy generation component 11 for generating energy, an energy distribution component 12 for distributing or transmitting energy, an energy storage component for storing energy, an energy management component 14 for managing energy, and an energy metering component 15 for metering information related to energy.

In a case where one or more components that constitute the UAN 10 consume energy, the components that consume the energy may be energy consumption components.

The energy consumption component is a component corresponding to the energy consumption component 26 that constitutes the HAN 20. The energy consumption component may be the same component as the energy consumption component 26 or may be another component distinguished from the energy consumption component 26.

The energy generation component 11 may be a power plant as an example. The energy distribution component 12 distributes or transmits energy generated in the energy generation component 11 and/or energy stored in the energy storage component 13 to the energy consumption component 26 that consumes the energy. The energy distribution component 12 may be a power transmitter, substation, sub-control center, or the like.

The energy storage component 13 may be a storage battery, and the energy management component 14 generates information for driving one or more of the energy generation component 11, the energy distribution component 12, the energy storage component 13 and the energy consumption component 26, related to energy. The energy management component 14 may generate at least a command for the operation of a specific component.

The energy management component 14 may be an EMS. The energy metering component 15 may meter information related to the generation of energy, the distribution of energy, the usage of energy, the storage of energy, and the like. The energy metering component 15 may be an AMI as an example. The energy management component 14 may be a separate configuration, or may be included in another component as an energy management function.

The UAN 10 may communicate with the HAN 20 by a terminal component (not shown). That is, information generated or transferred in a specific component that constitutes the UAN may be transmitted to the HAN 20 through the terminal component, or information generated or transferred in another component that constitutes the HAN 20 may be received to the UAN 10 through the terminal component. The terminal component may be a gate way as an example. The terminal component may be provided to one or more of the UAN 10 and the HAN 20.

The terminal component may be a component necessary for transmitting/receiving information between the UAN and the HAN.

Two components that constitute the UAN 10 may communicate with each other by means of a communication unit.

The HAN 20 includes an energy generation component 21 for generating energy, an energy distribution component 22 for distributing energy, an energy storage component 23 for storing energy, an energy management component 24 for managing energy, an energy metering component 25 for metering information related to energy, an energy consumption component 26 for consuming energy, a central management component 27 for controlling a plurality of components, and an energy grid assistance component 28.

The energy generation component 21 may be a home power generator, and the energy storage component 23 may be a storage battery. The energy management component 24 may be an EMS. As an example, the energy generation component 21 may be a solar cell, a fuel cell, a wind power generator, a power generator using subterranean heat, a power generator using seawater, or the like.

The energy storage component 23 may perform storage using energy generated from the energy generation component 21. Therefore, in view of the use of energy, the energy storage component 23 and the energy generation component 11 may be an energy using component that uses energy together with the energy consumption component 26. That is, the energy using component may include at least an energy consumption component, an energy generation component and an energy storage component. In a case where the energy management component uses energy, it may be included in the energy using component.

In view of the supplied energy, the energy storage component 23, the energy consumption component and the energy generation component 11 may be an energy supplied component to which energy is supplied.

The energy metering component 25 may meter information related to the generation of energy, the distribution of energy, the usage of energy, the storage of energy, and the like. The energy metering component 25 may be a smart meter as an example. The energy consumption component 26 may be, as an example, an electric home appliance or a heater, motor, display or the like, which constitutes the electric home appliance. In this embodiment, there is no limitation in the kind of the energy consumption component 26.

Although not shown, the network system may include an accessory component or a consumable handling component. The accessory component may be an energy network-only component which performs an additional function for the energy network. For example, the accessory component may be an energy network-only weather reception antenna.

The consumable handling component may be a component for storing, supplying, and transferring a consumable and confirms and recognize information about the consumable. For example, the consumable may be a product or material which is used or handled during the operation of the component. Also, the consumable handling component may be managed in the energy network, e.g., the energy management component. For example, the consumable may be a washing cloth of a washing machine, a cooking item of a cooking appliance, or a detergent for cleaning the washing cloth in the washing machine, or a fiber conditioner, or seasoning for cooking item.

Figure 3:
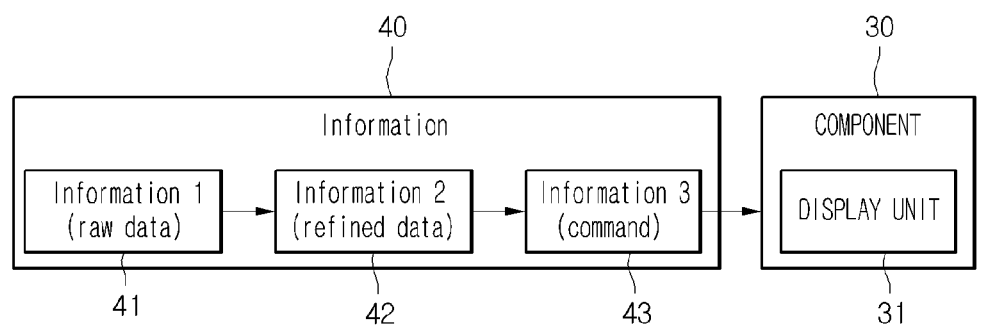
FIG. 3 is a block diagram showing an information transmission process on the network system according to the present disclosure.

FIG. 3 is a block diagram showing an information transmission process on the network system according to the present disclosure.

Referring to FIG. 3, in the network system according to the present disclosure, a specific component 30 may receive information related to energy (hereinafter, referred to as energy information 40) by means of a communication unit. The specific component 30 may further receive additional information (environment information, time information and the like) by means of the communication unit. In this instance, the information may be received from another component. That is, at least energy information is contained in the received information.

The specific component 30 may be a component that constitutes the UAN 10 or a component that constitutes the HAN 20.

As described above, the energy information 40 may be one of information related to electricity, water, gas and the like. Hereinafter, information related to electricity will be described as an example of the energy information, but information related to other energy sources may be identically applied.

For example, the kind of information related to the electricity may include time-based pricing, curtailment, grid emergency, grid reliability, energy increment, operation priority, and the like.

The information may be divided into scheduled information previously produced based on previous information, and real-time information changed in real time. The scheduled information and the real-time information may be divided by whether or not predict information after the current time (in the future).

The energy information 40 may be transmitted/received as a true or false signal such as a Boolean signal on the network system, or may be transmitted/received as a real price. Alternatively, the energy information 40 may be transmitted/received by being divided into a plurality of levels.

The energy information 40 may be divided into time of use (TOU) information, critical peak pattern (CPP) information or real time pattern (RTP) information according to the change in the pattern of data with respect to time.

According to the TOU information, a data is changed step by step depending on time. According to the CPP information, a data is changed step by step or in real time depending on time, and emphasis is displayed at a specific point of time. According to RTP information, a data is changed in real time depending on time.

In a case where the energy information is time-based pricing information as an example, the time-based pricing information is changed. The time-based pricing information may be transmitted/received as a true or false signal such as a Boolean signal on the network system, or may be transmitted/received as a real price. Alternatively, the time-based pricing information may be transmitted/received by being divided into a plurality of levels.

In a case where the specific component 30 receives a true or false signal such as a Boolean signal, one signal may be recognized as an on-peak signal, and the other signal may be recognized as an off-peak signal.

Alternatively, the specific component 30 may recognize information on at least one drive, which contains the time-based information, and may recognize an on-peak or off-peak signal by comparing the value of the recognized information with the value of reference information.

For example, in a case where the specific component 30 recognizes information divided into levels or real pricing information, it recognizes an on-peak or off-peak signals by comparing the value of the recognized information with the value of reference information.

In this case, the value of the information on drive may be at least one of time-based pricing, electric energy, the variation of time-based pricing, the variation of electric energy, the average of time-based pricing and the average of electric energy. The value of reference information may be at least one of an average, the average between maximum and minimum values of power information during a predetermined period of time and the reference variation of power information during the predetermined period of time (e.g., the slope of consumed electric energy per unit time).

The value of reference information may be determined in real time or may be previously determined. The value of reference information may be determined on the UAN or may be determined on the HAN (a customer's direct input or an input from the energy management component, the central management component or the like).

In a case where the specific component 30 (e.g., the energy consumption component) recognizes an on-peak signal (e.g., at a point of time of recognition), an output may be determined as zero (stop or maintenance of a stop state) or may be decreased. If necessary, the output may be restored or increased. The driving scheme of the specific component may be previously determined before the specific component is operated, or may be changed when the specific component recognizes an on-peak signal posterior to the start of operation.

Alternatively, in a case where the specific component recognizes an on-peak signal (e.g., at a point of time of recognition), the output is maintained under an operable condition. In this case, the operable condition means that the value of the information on drive is less than a predetermined reference. The value of the information on drive may be time-based pricing, consumed electric energy, operation time, or the like. The predetermined reference may be a relative or absolute value.

The predetermined reference may be determined in real time or may be previously determined. The predetermined reference may be determined on the UAN or may be determined on the HAN (a customer's direct input or an input from the energy management component, the central management component or the like).

Alternatively, in a case where the specific component 30 recognizes high-cost information, the output of the specific component may be maintained or increased when the difference between a state information value and a reference value is within a predetermined range. For example, in a case where a compressor of a refrigerator is not operated in a low-cost section, the temperature of a cool chamber or freezing chamber is increased. Therefore, the compressor is necessarily turned on when the temperature of the cool chamber or freezing chamber approaches a reference temperature. In a case where a high-cost section comes after the compressor is turned on, the compressor maintains a current output when the difference between the temperature of the cool chamber or freezing chamber and the reference temperature is within a predetermined range. In a case where a user selects a button for cancelling power saving in the state that the specific component 30 recognizes the high-cost information, the output of the specific component may be maintained.

Alternatively, in a case where the specific component recognizes an on-peak signal (e.g., at a point of time of recognition), the output may be increased. However, although the output is increased at the point of time when the specific component recognizes the on-peak signal, the total output amount of the specific component during the entire drive period may be decreased or maintained as compared with that when the specific component is operated at a normal output level. Alternatively, although the output is increased at the point of time when the specific component recognizes the on-peak signal, the total consumed power or total time-based pricing of the specific component during the entire operation period may be decreased as compared that when the specific component is operated at a normal output level.

In a case where the specific component 30 recognizes an off-peak signal (e.g., at a point of time of recognition), the output may be increased. For example, in a case where the operation reservation of the specific component is set up, the drive of the specific component may be started before the setup time, or a component having a large output among a plurality of components may be first driven. In a case where the specific component is a refrigerator, supercooling may be performed by increasing an output as compared with the existing output (change in the state of cool air that is a medium for performing the function of the refrigerator). In a case where the specific component is a washing machine or washer, hot water may be stored by driving a heater earlier than the time when the heater is to be operated (storage of hot water that is an additional medium for performing the function of the washing machine or washer). Alternatively, in a case where the specific component is a refrigerator, cool air may be stored in a separate supercooling chamber by increasing an output as compared with the existing output. Alternatively, in a case where the specific component recognizes an off-peak signal (e.g., at a point of time of recognition), electricity may be stored.

The curtailment information is information related to a mode in which the specific component is stopped or a small amount of time-based pricing is taken. As an example, the curtailment information may be transmitted/received as a true or false signal such as a Boolean signal on the network system.

If the specific component 30 recognizes curtailment information, the output may be determined as zero (stop or maintenance of a stop state) or may be decreased as described above.

The grid emergency information is information related to a power failure or the like. As an example, the grid emergency information may be transmitted/received as a true or false signal such as a Boolean signal on the network system. The information related to a power failure or the like has a relation with the reliability of a component using energy.

In a case where the specific component 30 recognizes grid emergency information, it may be immediately shut down.

The grid reliability information is information related to the supply amount of electricity supplied or information related to the quality of electricity. The grid reliability information may be transmitted/received as a true or false signal such as a Boolean signal on the network system, or may be determined by a component (e.g., an electric home appliance) through the frequency of AC power supplied to the component.

That is, if a frequency lower than the frequency of AC power supplied to the component is sensed, it may be determined that the amount of electricity supplied is small (information on the deficiency of the amount of electricity supplied). If a frequency higher than the frequency of AC power supplied to the component is sensed, it may be determined that the amount of electricity supplied is large (information on the excess of the amount of electricity supplied).

In a case where the specific component recognizes shortage of the amount of electricity or poor quality of electricity in the grid reliability information, an output may be determined as zero (stop or maintenance of a stop state) or may be decreased. If necessary, the output may be restored or increased.

On the other hand, in a case where the specific component recognizes the information on the excess of the amount of electricity supplied, the output may be increased, or the operation may be converted from an off-state to an on-state.

The energy increment information is information related to a state that surplus electricity is generated because the amount of electricity used by a component is less than that of power generation. As an example, the energy increment information may be transmitted/received as a true or false signal such as a Boolean signal on the network system.

In a case where the specific component 30 recognizes energy increment information, the output may be increased. For example, in a case where the operation reservation of the specific component is set up, the drive of the specific component may be started before the setup time, or a component having a large output among a plurality of components may be first driven. In a case where the specific component is a refrigerator, supercooling may be performed by increasing an output as compared with the existing output. In a case where the specific component is a washing machine or a washer, hot water may be stored by driving a heater earlier than the time when the heater is to be operated. Alternatively, in a case where the specific component recognizes an off-peak signal (e.g., at a point of time of recognition), electricity may be stored.

Meanwhile, in a case where the specific component 30 is the energy storage component 13 or 23, the energy storage component 13 or 23 may store electricity by receiving the electricity supplied from the UAN, for example, when electricity storage cost is smaller than a predetermined value.

However, in a case where the energy storage component is connected to the energy generation component 21 that constitutes the HAN, it may continuously store energy generated by the energy generation component 21 until the electricity storage is completed. That is, the energy generated while the energy generation component 21 generates energy may be stored in the energy storage component 23.

The presence of completion of the electricity storage is determined while the energy storage component 13 or 23 stores electricity. In a case where the electricity storage is completed, the electricity supply for the electricity storage is cut off. Specifically, the presence of completion of the electricity storage may be determined using a sensor that senses the voltage, temperature or current of the energy storage component 13 or 23. The cutoff of the electricity supply may be performed using a switch (or circuit breaker) provided to a supply stage through which the electricity is supplied to the energy storage unit 13 or 23.

The electricity storage cost may be cost consumed in the electricity storage for a specific time period or electricity cost at a specific time.

As an example, in a case where the electricity storage cost is in an off-peak section (in a case where the specific component recognizes low-cost information which will be described later), the energy storage component 13 or 23 may store electricity. Alternatively, in a case where an on-peak section corresponds to an allowance section (in a case where the specific component recognizes high-cost information which will be described later), the energy storage component 13 or 23 may store in the on-peak section. In this instance, the allowance section is a section in which a power consumption information value is less than a predetermined reference. The power consumption information value may be a electricity cost, a power consumption amount, a time range, or the like. The predetermined reference may be a predetermined cost, a predetermined power consumption amount, a predetermined time, or the like. The predetermined reference may be a relative value or absolute value, and may be changed automatically or manually.

The energy storage component 13 or 23 may store a counter electromotive force generated when an energy consumption component that is rotatably operated or a motor provided to the energy consumption component is stopped (rotated).

Alternatively, the energy storage component 13 or 23 may store electricity using an energy consumption component that is rotatably operated or a motor provided to the energy consumption component. For example, in a case where the energy consumption component is a refrigerator, the energy storage component 13 or 23 may store electricity generated when a fan motor provided to the refrigerator is rotated (the fan motor may serve as a power generator or may be connected to the power generator). Alternatively, in a case where the energy consumption component is a washing machine, the energy storage component 13 or 23 may store electricity generated when a motor that rotates a drum for accommodating the laundry is rotated. In a case where the energy consumption component is a cooking appliance, the energy storage component 13 or 23 may store electricity generated when a motor for rotating a cooling fan is rotated. In a case where the energy consumption component is an air cleaner, the energy storage component 13 or 23 may store electricity generated when a motor for rotating a fan is rotated. That is, in this embodiment, in a case where a motor is provided regardless of the kind of the energy consumption component, the energy storage component 13 or 23 may store electricity generated when the motor is rotated. Alternatively, in a case where a power generator is connected to a fan rotated by the flow of air (natural flow or forcible flow), the energy storage component 13 or 23 may store electricity generated by the power generator.

The electricity stored in the energy component 13 or 23 may be supplied to one or more energy consumption components 26. In a case where electricity cost is higher than a reference value, the electricity stored in the energy component 13 or 23 may be supplied to the energy consumption component 26. As an example, in a case where the electricity cost is an on-peak (in a case where the specific component recognizes the high-cost information), the electricity stored in the energy storage component 13 or 23 may be supplied to the energy consumption component 26. In a case where the electricity cost is an off-peak (in a case where the specific component recognizes the low-cost information) but is close to the on-peak, the electricity stored in the energy storage component 13 or 21 may be supplied to the energy consumption component. If the electricity stored in the energy storage component 13 or 23 is less than a predetermined value, electricity generated in the energy generation component 11 is supplied to the energy consumption component. Thus, it is possible to prevent the operation of the energy consumption component from being stopped due to the cutoff of the electricity supply while the energy consumption component is operated.

In a case where the supply of electricity generated in the energy generation component 11 is cut off by interruption of electric power, the electricity stored in the energy component 13 or 23 may be supplied to the energy consumption component. In a case where the energy consumption component is an electric product, the electricity stored in the energy storage component 13 or 23 may be supplied to a communication unit or control unit provided to the electric product.

The electricity stored in the energy component 13 or may be supplied to a portion of a plurality of energy consumption components. As an example, the stored electricity may be supplied to an electric product such as a refrigerator required in continuous operation among a plurality of electric products. Alternatively, the stored electricity may be supplied to an energy consumption component with relatively low power among a plurality of energy consumption components that constitute one electric product. It will be apparent that the stored electricity is supplied to an energy consumption component with high power. Alternatively, when a course using a relatively small amount of power is performed among a plurality of courses in which an electric product is performed, the stored electricity may be supplied. It will be apparent that the stored electricity may be supplied even when a course using a large amount of power is performed.

Meanwhile, in a case where electricity is generated and stored by a fan or motor as described above, the electricity stored in the energy storage component 13 or 23 may be supplied to an energy consumption unit with relatively low power. As an example, the electricity stored in the energy storage component 13 or 23 may be supplied to an LED lamp, a display, a control unit, a communication unit, a low-power heater, or the like. Alternatively, in a case where the energy consumption component performs a plurality of courses, the electricity stored in the energy storage component 13 or 23 may be supplied to the energy consumption component in a course that requires low power.

The energy storage component 23 may be built in connected to one energy consumption component. Alternatively, a plurality of energy storage components 23 may be built in or connected to a plurality of energy consumption components, respectively. Alternatively, a plurality of energy storage components 23 may be built in or connected to one energy consumption component. The plurality of energy storage components 23 may be connected to one another to share the stored electricity.

Among the information related to energy, the on-peak information, the curtailment information and information on the deficiency of the amount of electricity supplied may be recognized as high-cost information considered that energy cost is relatively expensive. In this instance, the section in which the high-cost information is recognized by the specific component may referred to as a low-cost section.

On the other hand, among the information related to energy, the off-peak information, the energy increment information and the information on the excess of the amount of electricity supplied may be recognized as low-cost information considered that energy cost is relatively cheap. In this instance, the section in which the low-cost information is recognized by the specific component may be referred to as a low-cost section.

The information related to the fluctuation of the energy cost (high-cost or low-cost information) may be recognized as information for determining a power saving driving scheme of the specific component (e.g., the energy consumption component). That is, the information related to the fluctuation of the energy cost may be recognized by dividing a time slot (time period) based on energy cost or pricing period (pricing zone) for determining a driving scheme of the specific component into at least two or more.

A high period means a high price time period (period of high cost) or a high pricing period and a low period means a low price time period (period of low cost) and a low pricing period.

As an example, in a case where the information related to energy is recognized as a Boolean signal, the time slot (time period) based on energy cost or pricing period (pricing zone) for determining a driving scheme of the specific component may be divided into two. In a case where the information related to energy is divided into a plurality of levels or recognized as real-time information, the time period or pricing period may be divided into three or more.

Meanwhile, the information related to energy cost corresponding to at least time may be recognized as information for determining a power saving driving scheme of the specific component. That is, the information related to energy cost may be recognized by dividing a time slot (time period) or pricing zone (time period) into at least two or more. As described above, the divided time period or pricing period may be determined based on the kinds of the recognized information (the Bloolean signal, the plurality of levels and the real-time information).

In other words, the information related to fluctuation of energy cost may be recognized by dividing a determination factor for driving the specific component into two or more, and functions on time and energy cost may be included in the determination factor.

In a case where the information related to energy cost is divided into two levels or more, the driving scheme of the specific component may be determined according to the information divided into levels.

On the other hand, in a case where the recognized information related to energy cost is not divided based on a specific reference (e.g., real-time cost information), it is compared with predetermined information, and the driving scheme of the specific component may be determined based on the compared result.

Here, the predetermined information may be reference information (e.g. reference value) for dividing the information related to energy cost, and the compared result may be whether not the information related to energy cost is more or less than the reference value.

Specifically, each of the kinds of information related to energy may be divided into first information 41 that is raw information, second information 42 that is refined information, and third information 43 that is information for performing the function of the specific component. That is, the first information is a raw data, the second information is a refined data, and the third information is a command for performing the function of the specific component.

The information related to energy is included a signal, and the signal is transmitted. In this instance, one or more of the first to third information may be transmitted several times while the content of the information is not converted but only the signal including the information is converted.

For example, as shown in FIG. 3, a component that receives a signal including the first information may convert only the signal and transmit a new signal including the first information to another component.

Therefore, it is described in this embodiment that the conversion of signal is a different concept from the conversion of information. In this instance, it can be readily understood that when the first information is converted into the second information, the signal including the first information is also converted into the signal including the second information.

However, the third information may be transmitted several times in the state that the content of the third information is converted or in the state that only the signal including the third information is converted while the content of the third information is identically maintained.

Specifically, in a case where the first information is raw information on time-based pricing, the second information may be refined information on the time-based pricing. The refined information on the time-based pricing is information in which the time-based pricing is divided into a plurality of levels or analysis information. The third information is a command generated based on the second information.

The specific component may generate, transmit or receive one or more of the first to third information. The first to third information are not necessarily transmitted or received in sequence. Only a plurality of pieces of third information without the first and second information may be transmitted in sequence or parallel. Alternatively, the first and third information may be transmitted or received together, the second and third information may be transmitted or received together, or the first and second information may be transmitted or received together.

As an example, in a case where the specific component receives the first information, it may transmit the second information or may transmit the second and third information.

In a case where the specific information receives only the third information, it may generate and transmit new third information.

Meanwhile, in the relation between two pieces of information, one is a message and the other is a response for the message. Thus, each of the components that constitute the network system may transmit or receive a message. In a case where each of the components receives a message, it may respond to the message. Therefore, in the case of an individual component, the transmission of a message is a relative concept with the response for the message.

The message may include a data (first or second information) and/or a command (third information).

The command (third information) may include a command for storing the data, a command for generating the data, a command for processing the data (including the generation of an additional data), a command for generating an additional command, a command for transmitting the additionally generated command, a command for transmitting a received command, and the like.

In this specification, the response for the received message means storage of the data, processing of the data (including generation of an additional data), generation of a new command, transmission of the newly generated command, simple transmission of a received command (including generation of a command for transmitting the received command to another component), operation, transmission of the stored information, transmission of an acknowledge message (acknowledge character or negative acknowledge character), or the like.

For example, in a case where the message is first information, the specific component that receives the first information may generate second information by processing the first information, or may generate the second information and new third information, as a response for the message.

The specific component that receives the message may provide a response related to energy. Here, the term "response" may be understood as a concept including an operation through which the specific component can perform a function. As an example, the HAN 20 may perform an operation related to energy by receiving a message.

The response (operation) related to energy, provided by the specific component, will be described in detail. For example, the specific component may be an energy consumption component.

The energy consumption component may be driven so that the energy cost when it is driven based on the recognition for energy information is reduced as compared with that when it is driven without the recognition for energy information.

The specific component may include a plurality of modes in which it is driven to perform its own function. The plurality of modes are a first mode and a second mode in which energy cost is relatively saved as compared with that in the first mode. The specific component may be driven in at least one of the first and second modes.

Here, the first mode may be a general mode and the second mode may be a power saving mode. Alternatively, the first and second modes may all be power saving modes.

The general mode may be understood as a mode in which the function of the specific component is performed without recognition of energy information. On the other hand, the power saving mode may be understood as a mode in which the function of the specific component is performed based on the recognition of energy information so as to save energy cost.

In a case where the first and second modes are power saving modes, the first mode may be specified as a driving scheme for saving energy cost and the second mode may be specified as a driving scheme in which the energy cost in the second mode is more saved than that in the first mode.

Meanwhile, in a case where the specific component (e.g., the energy consumption component) is driven, at least a portion is recognized in a driving scheme including at least drive time and course. In this case, an unrecognized portion may be generated so as to save energy cost, and a recognized portion may be converted into another scheme.

For example, at least a portion of the driving scheme may be recognized under the control of the energy management component, the control of the energy consumption component, or the like. In a case where a specific driving scheme is further required so as to save energy cost, an unrecognized portion of the driving scheme may be newly generated, and a recognized portion may be converted into another scheme so as to save energy.

It will be apparent that the process of generating the unrecognized portion may be omitted. In this case, the process of converting the recognized portion into another scheme. On the other hand, the process of converting the recognized portion into another scheme may be omitted. In this case, the process of newly generating the unrecognized portion may be performed.

The drive time may include a drive start time or drive end time. The course may include a drive period of the specific component and the power of the specific component.

The generated scheme or converted scheme may be a scheme recommended by the specific component so as to save energy cost. Here, the specific component may be an energy consumption component (control component) or the energy management component.

As an example, in a case where the recognized scheme is a specific drive time, the specific drive time may be converted into another time so as to save energy cost, and a specific course may be generated.

On the other hand, in a case where the recognized scheme is a specific course, the specific course may be converted into another course so as to save energy cost, and a specific time may be generated.

Under the control described above, a change in time or power may be made with respect to the output function of the specific component based on time.

The generated scheme or converted scheme may be performed within a set range. That is, in the process of recognizing at least a portion of the driving scheme, the generation or conversion of the driving scheme may be performed within a predetermined reference in which the recognized portion appears (e.g., restriction set by a user, constraint set under the control of the energy management component or energy consumption component, or the like).

Therefore, in a case where the set range is out of the predetermined reference, it is restricted to generate the unrecognized portion or to convert the recognized portion into another scheme.

Another embodiment is proposed.

Cost information may further included in the recognized driving scheme. That is, in a case where the cost information is recognized, a portion related to the drive time or course may be generated. The generated driving scheme may be recommended.

Meanwhile, a response of the specific component based on the information related to the fluctuation of the energy cost (high-cost or low-cost information), e.g., a power control for power saving driving, may be performed. An output decrease (including an output of zero) or output increase may be included in the output control.

It is as described above that the output is decreased or zero, maintained or increased based on the recognition for the information (on-peak or off-peak) related to energy cost.

If high-cost information is recognized, the output may be zero or decreased. Specifically, the output in the recognition of the high-cost information may be decreased as compared with that in the recognition of low-cost information. As described above, the decrease of the output may be previously determined before the specific component is operated, or may be changed when the high-cost information is recognized posterior to the start of the operation of the specific component.

In a case where the output of the specific component is zero or decreased, the function to be performed by the specific component may be lost as compared with a normal case. Therefore, a response for restoring the lost function may be performed.

As an example, after the output of the specific component is decreased, the specific component may be controlled so that the total operation time of the specific component is increased or so that the output is increased in at least a time period.

In other words, if specific reference information related to energy information is recognized in a period after the output of the specific component is controlled, the response for controlling the output may be released. Here, the term "period" may be divided based on a point of time when the high-cost information is recognized.

The total operation time may be understood as a time approaching a specific target in the process of performing the function of the specific component. As an example, in a case where the specific component is an electric appliance (washing machine, drying machine, cooking appliance or the like) intermittently driven (or driven in a specific course), the total operation time may be understood as a time until a corresponding course is completed.

On the other hand, in a case where the specific component is an electric appliance (refrigerator, water purifier, or the like) driven at normal times, the total operation time may be understood as a time approaching a target set for performing the function of the specific component. For example, the set target may be a target temperature, a target amount of ice produced, or a target amount of clean water in the refrigerator.

The total operation time may be increased as compared with the operation time set before the output of the specific component is decreased. In a case where the output of the specific component is not decreased, the total operation time may be increased as compared with the operation time of the specific component. However, although the total operation time of the specific component is increased, the specific component is controlled so that the total energy cost generated through the drive of the specific component can be saved as compared with that when the output of the specific component is not decreased.

If the high-cost information is recognized, the output of the specific component may be increased.

However, although the output is increased at a point of time when the high-cost information is recognized, the total output of the specific component during the entire driving period may be decreased or maintained as compared with that when the specific component is operated under a normal output. Alternatively, although the output is increased at a point of time when the high-cost information is recognized, the total power consumption or total time-based pricing of the specific component during the entire driving period may be decreased as compared with that when the specific component is operated under the normal output.

If the low-cost information is recognized, the output of the specific component may be increased. For example, in a case where the operation reservation of the specific component is set up, the driving of the specific component may be started before the setup time, or a component having a large output in a plurality of components may be first driven. In a case where the specific component is a refrigerator, supercooling may be performed by increasing an output as compared with the existing output. In a case where the specific component is a washing machine or a washer, hot water may be stored by driving a heater earlier than the time when the heater is to be operated. Alternatively, in a case where the specific component recognizes an off-peak signal (e.g., at a point of time of recognition), electricity may be stored.

Meanwhile, in a case of a specific condition (additional condition) is generated based on the information related to the fluctuation of the energy cost (high-cost or low-cost information), the response of the specific component, e.g., the output control for power saving driving, may be limited. That is, the output of the specific component may be maintained.

Here, the term "limitation" may be understood as the release of the output control performed or not performed.

The specific condition includes a case where influence on energy cost is minute even though the output control of the specific component is not performed or a case where it is necessary to prevent a function to be performed by the specific component from being degraded when the output of the specific component is controlled.

Whether or not the influence on the energy cost is minute may be determined based on a predetermined reference (time-based pricing, power consumption or information on operation time). The predetermined reference may be a relative or absolute value.

The case where the function to be performed by the specific component is degraded may be considered as a case where the specific component is a defrosting heater, for example.

In a case where it is controlled to decrease the output in a high-cost time period and to increase the output in the low-cost time period, the driving of the defrosting heater is more frequently performed than that during a normal time (setup period). In this case, the temperature of a storage room in the refrigerator is increased, and thus, the control of the output can be limited.

Meanwhile, the specific component 30 may include a display unit 31 for displaying information. In this embodiment, the term "information display" means that visual, auditory, olfactory, and tactile information is known to the outside. Also, the display unit 31 may include a touch screen for selecting or inputting information. Alternatively, the specific component 30 may include a separate input unit for inputting information by cable or radio.

All the information (energy information or additional information except the energy information) described above may be displayed on the display unit 31. One of the energy information and additional information may be displayed, or two or more pieces of information may be simultaneously displayed. That is, two or more pieces of information may be simultaneously displayed on the display unit 31. As an example, in a case where two or more pieces of information are simultaneously displayed, any one of the information is selected. Then, the selected screen may be enlarged, and the unselected screen may be reduced. For another example, if any one of the two or more pieces of information is selected, the selected screen may be enlarged, and the unselected screen may be disappear. In a case where specific information is selected and the selected screen is enlarged, information more specific than the previous information or information different from the previous information may be displayed on the enlarged screen. For example, in a case where the selected information is character, graphic information may be displayed on the enlarged screen. Alternatively, two or more pieces of information may be sequentially displayed on the enlarged screen. In a case where two or more pieces of information are displayed on the display unit 31, two or more relative positions may be varied.

Information except energy cost information and energy cost may be displayed on the displayed unit 31. The energy cost information may include current cost, past cost, or estimated cost in the future. The energy cost information may include not only information on cost information in a specific period or time but also information on cost used with respect to the operation of a component, cost used in the present, cost to be used (estimation cost), or the like.

The information except the energy cost information may include information on energy reduction, emergency situation, grid safety, power generation quantity, operation priority, energy consumption, energy supply amount, information (e.g., cost change rate, average cost, level or the like) newly generated based on two or more pieces of information (one or more pieces of energy cost information and/or information except the one or more pieces of energy cost information), and the like. Here, the energy consumption may be energy consumption used two or more home networks, and may be simultaneously or selectively displayed.

The information on energy consumption may include information on past consumption, current consumption and estimated consumption in the future. The information on energy consumption may include information on accumulated consumption for a specific period (time), average consumption, increasing rate of consumption, decreasing rate of consumption, maximum consumption, minimum consumption, and the like.

The additional information may include one or more of environment information, time information, information related to the one or more components, information related to another component, and information related to a user using the one or more components. The environment information may include one or more of information related to carbon dioxide emission rate, concentration of carbon dioxide in air, temperature, humidity, precipitation, presence of rainfall, amount of solar radiation, amount of wind. The time information may include one or more of current time information, time information related to energy, and information related to an operation of the one or more components.

In addition to the information described above, information refined based on at least one information or newly generated information may also be displayed on the display unit 31.

In a case where the specific component 30 is the energy storage component 13 or 23, the presence of use of the stored electricity, the remaining amount of the store electricity and the like may be displayed. If the remaining amount of the stored electricity is less than a predetermined value, alarm information may be displayed.

The information displayed on the display unit 31 may include one or more of information on number, character, sentence, figure, shape, symbol, image and light. The information displayed on the display unit 31 may include one or more of information on graph for each time or period, level, table. One or more of the shape, color, brightness, size, position, alarm period, alarm time of the information displayed on the display unit 31 may be varied.

A currently operable function (or menu) may be displayed on the display unit 31. Alternatively, among a plurality of functions, operable and inoperable function may be divided by size, color, position and the like, and then displayed on the display unit 31. Alternatively, in a case where separate input units are provided, only an input unit for selecting an operable function may be activated, or an input unit for selecting an operable function and an input unit for selecting an inoperable function may be displayed in different colors. The target or display method of information displayed on the display unit 31 may be set and changed by a user, or may be changed automatically.

In a case where a condition for informing the user of information is satisfied, specific information may be displayed on the display unit 31. It will be apparent that a portion of a plurality of pieces of information may be continuously displayed in the state that a component is turned on. The display time of the information may be changed or set automatically or manually.

If specific information (one or more pieces of information) is selected using the input unit, the selected information may be displayed. If a user contacts a portion of a component, e.g., an input unit, a handle, a display or the like, regardless of information display selection, or operates one or more buttons or knobs that constitute the input unit, a portion of the information may be displayed. In this instance, the information to be displayed may be set or changed. It will be apparent that a sensing unit for sensing a user's contact may be provided to the component. Alternatively, the specific information may be displayed by installation environment or variation of outdoor environment. Alternatively, the specific information may be displayed when the specific component receives new information. Alternatively, the specific information may be displayed when the kind or state of the specific component is changed. As an example, if a light emitting unit is turned off in an off-peak section and an on-peak section comes, the light emitting unit may be turned on. Alternatively, the specific information may be automatically displayed when the operation or state of the component is changed. As an example, in a case where the mode of the component is changed, information related to the changed mode may be automatically displayed.

Meanwhile, the display unit 31 may be separably connected or fixed to the component 30. In a case where the display unit 31 is separable from the component 30, it may perform wired or wireless communication with the component 30 (or control unit of the component). In a case where the display unit is fixed to the component 30, it may also perform wired or wireless communication with the component 30.

In a case where the display unit 31 is separable from the component 30, a communication unit and an input unit for inputting or selecting information may be provided to the display unit 31. Thus, information can be inputted or selected through the input unit in the state that the display unit 31 is separated from the component 30. The communication unit may be provided to the component 30, and only the display unit 31 may be separated from the component 30. The display unit 31 may be the energy management component 24, the energy metering component 25 or the central management component 27, or may be a separate control apparatus.

In a case where the display unit 31 is provided with a communication unit, a communication unit may also provided to the component 30. In a case where the display unit 31 and the component 30 are in the state that they are communicated with each other and information is transmitted/receive through a communication signal, the display unit 31 may be used. That is, in a case where the intensity of a signal is secured so that information can be included in the communication signal, the display unit 31 may be in an available state. On the other hand, in a case where the display unit 31 is not communicated with the component 30 or information is not included in the communication signal due to the weak intensity of the signal, the display unit may be in an unavailable state. One of the display unit 31 and the component 30 transmits a communication signal, and the other of the display unit 31 and the component 30 transmits a response signal. The presence of use of the display unit 31 may be determined by the presence of reception of the communication and response signals and the signal intensity. That is, in a case where any one of the display unit 31 and the component 30 does not receive a signal or the intensity of received signal is less than reference intensity, it may be determined that the display unit 31 is unavailable. Any one of the display unit 31 and the component 30 may increase the intensity of a transmission signal until it receives a response signal of which intensity is more than the reference intensity.

Information for informing the user of the presence of use of the display unit 31 may be displayed on the display unit 31 or the component 30. If it is recognized that the display unit 31 is unavailable, the component 30 may be controlled to increase its unique performance, to perform a door locking function or to limit its operation. Alternatively, the power of the component may be off while maintaining the power of a communication apparatus (modem) required for performing communication in the network system. Alternatively, the power of the component may be turned off while maintaining only a memory function for storing the state information of the component.

Meanwhile, sensors may be provided to the respective display unit 31 and component 30 so as to sense the presence of mounting of the display unit 31. As an example, the presence of mounting of the display unit 31 may be determined when the component 30 is operated. Each of the sensors may be a vibration sensor for sensing vibration. If the display unit 31 is mounted on the component 30, vibration generated in the operation of the component 30 can be transferred to the display unit 31. Therefore, in a case where the difference between the values of vibrations respectively sensed by the sensors is less than a predetermined value, it may be recognized that the display unit 31 is mounted on the component 30. If it is recognized that the display unit 31 is mounted on the component 30, the operation of the component 30 may be controlled so that vibration or noise generated in the operation of the component 30 is decreased.

As an example, in a case where the component 30 is a washing machine or drier, the rotation speed of a motor may be decreased. In a case where the component 30 is a refrigerator, the driving period of a compressor may be decreased. On the contrary, if it is recognized that the display unit 31 is separated from the component 30, the component may be controlled to increase its unique performance, to perform a door locking function or to limit its operation.

As another example, each of the sensors may be a temperature sensor. In a case where the difference between the values of temperatures respectively sensed by the sensors is less than a predetermined value, it may be recognized that the display unit 31 is mounted on the component 30.

In the state that the display unit 31 is separated from the component 30, an auxiliary display unit may be provided to the component 30 so as to enable the operation of the component 30. The presence of operation of the auxiliary display unit may be determined based on the presence of use of the display unit 31. As an example, if the display unit 31 is separated from the component 30 or is unavailable, the auxiliary display unit may be turned on.

Figure 4:
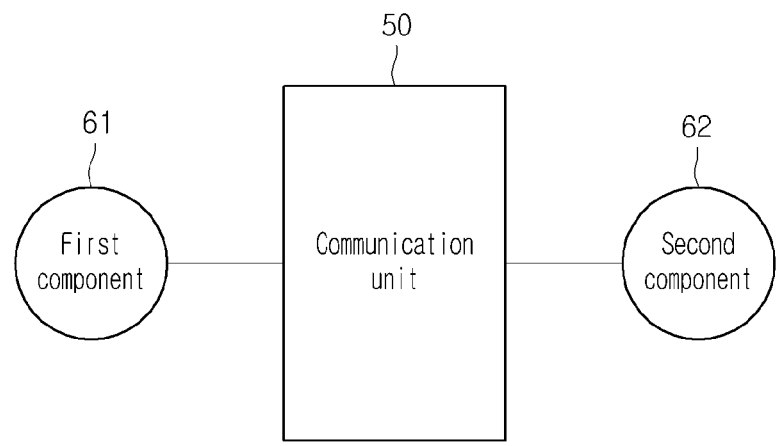
FIG. 4 is a view showing the communication structure of two components that constitute the network system according to a first embodiment.
Figure 5:
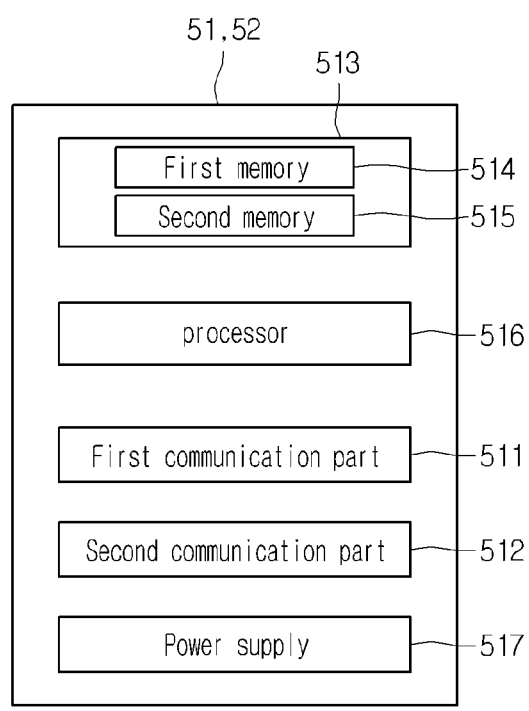
FIG. 5 is a block diagram showing the detailed configuration of a communication device that constitutes a communication unit.

FIG. 4 is a view showing the communication structure of two components that constitute the network system according to a first embodiment. FIG. 5 is a block diagram showing the detailed configuration of a communication device that constitutes a communication unit.

Referring to FIGS. 2, 4 and 5, first and second component 61 and 62 that constitute the network system may perform wired or wireless communication by means of a communication unit 50. The first and second components 61 and 62 may perform unidirectional or bidirectional communication.

In a case where the two components 61 and 62 perform wired communication, the communication unit 50 may be a simple communication line or power line communication means. It will be apparent that the power line communication means may include communicators (e.g., a modem or the like) respectively connected to the two components.

In a case where the two components 61 and 62 perform wireless communication, the communication unit 50 may include a first communicator 51 connected to the first component 61 and a second communicator 52 connected to the second component 62. In this case, the first and second communicators 51 and 52 perform wireless communication with each other.

As an example, if any one of the first and second comunicators is powered on, one of the two communicators may transmit a network participation request signal, and the other of the two communicators may transmit a permission signal. As another example, if any one of the first and second comunicators is powered on, the powered-on communicator may transmit a network participation request signal to a communicator previously participated in the network, and the communicator that receives the request signal may transmit a permission signal to the powered-on communicator.

In a case where a communicator that recognizes energy information determines that an error occurs in the received information in the state that a specific component participates in the network, the information is re-requested. For example, in a case where the first communicator receives energy information from the second communicator but an error occurs in the received information, the first communicator may request the second communicator to re-transmit the energy information. If the first communicator does not receive normal information for a predetermined time or number of times, it is determined that the first communicator has an error. In this case, information for informing a user of the error may be displayed in the first communicator or the first component 61.

The first component 61 may be a component that constitutes the UAN 10 or a component that constitutes the HAN 20.

The second component 62 may be a component that constitutes the UAN 10 or a component that constitutes the HAN 20.

The first and second components 61 and 62 may be the same kind of component or different kinds of components.

Components may be joined in the UAN 10 or the HAN 20.

Specifically, addresses may be assigned to a plurality of components, e.g., first and second components, respectively. Here, the addresses are necessary for performing communication between the components and can be mapped to at least a group.

The address may be understood as values respectively converted from the unique code of the first or second component. That is, at least a portion of the components that constitute the network system may have an unchangeable/unique code, and the code may be converted into an address for building a network.

In other words, product codes for at least some of the plurality of components capable of constituting first and second networks may be converted into different network codes based on the constituted networks.

As an example, the product code may be a unique code determined in production of electric appliances or a code separately provided for the registration of a network. The product code may be converted into an identity (ID) for identifying a network to which the electric appliance is to be registered.

The first and second networks may be networks that constitute the UAN 10 or networks that constitute the HAN 20. On the other hand, the first and second networks may be the UAN 10 and the HAN 20, respectively. Alternatively, the first and second networks may be the HAN 20 and the UAN 10, respectively.

A first component and a second component for allowing the first component to participate in the network may be included in the plurality of components that constitute the network. For example, the first component may be an electric appliance and the second component may be a server.

Any one of the first and second components transmits a request signal for participating in the network, and the other of the first and second components may transmit a permission signal.

That is, a signal may be transmitted/received between the first and second components, and whether or not to participate in the network may be determined based on the transmission time or number of the signal.

As an example, the first component transmits a test signal to the second component, and it is determined whether or not a response signal from the second component is transmitted to the first component. In a case where the response signal is not transmitted, the first component re-transmits the test signal, and it is re-determined whether or not a response signal from the second component is transmitted to the first component. By repeating such a process, if the transmission number of the test signal exceeds the setting number of the test signal, it may be determined that the second component does not participate in the network.

Meanwhile, the first component may transmit the test signal to the second component. If a response signal from the second component is not transmitted within a setup time, it may be determined that the second component does not participate in the network.

The first and second communicators 51 and 52 may have the same structure. Hereinafter, the first and second communicators 51 and 52 will be referred to as a communicator 51 and 52.

The communicator 51 and 52 may include a first communication part 511 for communication with the first component 61, a second communication part 512 for communication with the second component 62, a memory 513 for storing information received from the first component 61 and information received from the second component 62, a processor 516 for performing information processing, and a power supply 517 for supplying power to the communicator 51 and 52.

Specifically, the communication language (or scheme) of the first communication part 511 may be identical to or different from that of the second communication part 512.

Two kinds of information respectively received from the two components may be stored in the memory 513. The two kinds of information may be stored in a single sector or may be respectively stored in sectors. In any case, an area in which the information received from the first component 61 may be referred to as a first memory 514, and an area in which the information received from the second component 62 may be referred to as a second memory 515.

The processor 516 may generate first information or generate second and third information based on information received from the component or another communicator.

As an example, in a case where the communicator 51 and 52 receives the first information, it may generate information or sequentially generate the information and the second information by processing a data. Alternatively, in a case where the communicator 51 and 52 receives the first information, it may generate the second and third information by processing a data. In a case where the communicator 51 and 52 receives the third information, it may new third information.

For example, in a case where the second component is an energy consumption component (electric home appliance, component that constitutes the electric home appliance, or the like), the second communicator may generate a command for reducing energy consumption. In a case where the second component is an energy generation component, energy distribution component or energy storage component, the second communicator 52 may generate a command for energy generation time, generation amount, energy distribution time, distribution amount, energy storage time, storage amount or the like. In this case, the second communicator 52 serves as an energy management component.

The power supply 517 may receive electricity supplied from the components 61 and 62 or may receive electricity supplied from a separate power source. Alternatively, the power supply 517 may be a battery or the like.

Figure 6:
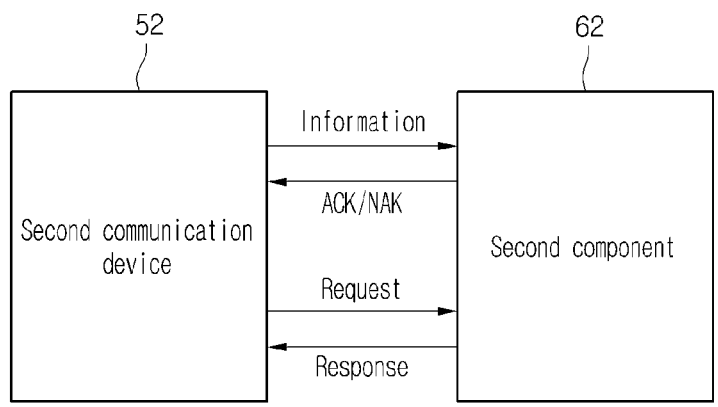
FIG. 6 is a view showing a communication performing process between a specific component and a communication device according to the first embodiment.

FIG. 6 is a view showing a communication performing process between a specific component and a communication device according to the first embodiment.

Hereinafter, for convenience of illustration, a communication performing process between the second component 62 and the second communicator 52 will be described as an example. A communication performing process between the first component 61 and the first communicator 51 may be identically applied to that between the second component 62 and the second communicator 62.

Referring to FIGS. 5 and 6, the second communicator 52 receives a message from the first communicator 51. The second communicator 52 may receive a message in real time or by periods without transmitting a request for the message to the first communicator 51, or may receive a message as a response for the request for the message to the first communicator 51. Alternatively, the second communicator 52 may receive a message by requesting information to the first communicator 51 at a point of time when it is initially turned on. Then, the second communicator 52 may receive information in real time or by periods from the first communicator 51 without a request for information.

The information received from the first communicator is stored in the memory 513. The second communicator 52 transmits a message to the second component 62 as a response for the message. In this instance, the message transmitted to the second component 62 relates to new information different from the information previously stored in the memory 513, or information generated in the processor 516.

Then, the second component 62 transmits an acknowledge character (ack) or negative acknowledge character (Nak) to the second communicator 52 as a response for the message. The second component 62 performs a function (generation of a command, operation, or the like) based on the received information, or waits for performing the function.

Meanwhile, the second communicator 52 requests component information to the second component 62 in real time or by periods. As an example, the component information may be component state information or information on a component unique code, a manufacturer, a service name code, an electricity use amount, and the like. Then, the second component 62 transmits component information to the second communicator 52 as a response for the request. The component information is stored in the memory 513 of the second communicator 52.

If the second communicator 52 receives a message for requesting the component information from the first communicator 51, it transmits the component information stored in the memory 513 to the first communicator 51 as a response for the message. Alternatively, the second communicator 52 transmits the component information stored in the memory 513 to the first communicator 51 in real time or by periods.

The second communicator 52 may transmit the information of the first component, stored in the memory, to the first component together with the information received from the first component. Alternatively, the second communicator 52 may transmit the information of the first component, stored in the memory, to the first component, separately from transmitting the information received from the first component.

The second communicator 52 stores the information of the second component 62 in the memory 513. Hence, in a case where the second communicator 52 receives a message for requesting the component information from the first communicator 51, it transmits the component information stored in the memory 513 directly to the first communicator 51 without a request for information to the second component 62, and thus, the communication load of the second component 62 can be reduced. That is, the second component becomes a virtual component.

Figure 7:
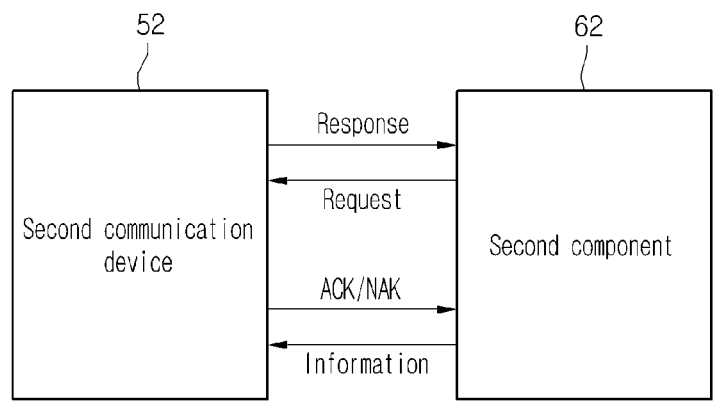
FIG. 7 is a view showing a communication performing process between a specific component and a communication device according to a second embodiment.

FIG. 7 is a view showing a communication performing process between a specific component and a communication device according to a second embodiment.

Hereinafter, for convenience of illustration, a communication performing process between the second component 62 and the second communicator 52 will be described as an example. A communication performing process between the first component 61 and the first communicator 51 may be identically applied to that between the second component 62 and the second communicator 62.

Referring to FIGS. 5 and 7, the second communicator 52 receives a message from the first communicator 51. The second communicator 52 may receive a message in real time or by periods without transmitting a request for the message to the first communicator 51, or may receive a message as a response for the request for the message to the first communicator 51. Alternatively, the second communicator 52 may receive a message by requesting information to the first communicator 51 at a point of time when it is initially turned on. Then, the second communicator 52 may receive information in real time or by periods from the first communicator 51 without a request for information.

If the second communicator 52 receives a message for requesting information from the second component 62, it transmits a message to the second component 62 as a response for the message for requesting the information. In this instance, the message transmitted to the second component 62 relates to new information different from the information previously stored in the memory 513, or information generated in the processor 516. Alternatively, the information transmitted to the second component 62 may be information received from the first component.

The second component 62 performs a function based on the received information or waits for performing the function.

Meanwhile, the second component 62 transmits component information to the second component 62 in real time or by periods. As an example, the component information may be component state information or information on a component unique code, a manufacturer, a service name code, an electricity use amount, and the like.

As described above, the electric use amount may be detected by the smart meter. In a case where the electricity use amount is included in the information of the second component 62, the correction of an actual electricity use amount may be performed by comparing the information of the second component 62 with the information of the smart meter.

Then, the second communicator 52 stores the information of the second component 62 in the memory 513, and transmits an acknowledge character (ack) or negative acknowledge character (Nak) to the second component 62 as a response for the message.

If the second communicator 52 receives a message for requesting component information from the first communicator 51, it transmits the information of the second component 62, stored in the memory 513, to the first communicator 51 as a response for the message. Alternatively, the second communicator 52 the information of the second component 62, stored in the memory 513, to the first communicator 51 in real time or by periods.

The second communicator 52 stores the information of the second component 62 in the memory 513. Hence, in a case where the second communicator 52 receives the message for requesting the component information from the first communicator 51, it transmits the information stored in the memory 513 directly to the first communicator 51 without transmitting a request for information to the second component 62, and thus, the communication load of the second component 62 can be reduced. That is, the second communicator 52 becomes a virtual component.

<Applications>

In the following descriptions, the first and second components may be reversed to each other, and therefore, overlapping descriptions will be omitted. For example, in a case where the first component is an electric home appliance and the second component is an energy management component, description in a case where the first component is an energy management component and the second component is an electric home appliance will be omitted.

Information transmitted/received by each of the components may be all the information described above. Particularly, specific information may be transmitted/received for each of the components.

The energy generation components 11 and 21 may transmit/receive information related to energy generation amount, and the like. The energy distribution components 12 and 22 may transmit/receive information related to energy distribution amount, distribution time, and the like. The energy storage components 13 and 23 may transmit/receive information related to energy storage amount, storage time, and the like. The energy metering components 15 and 25 may transmit/receive information related to energy consumption amount, and the like. The energy management components 14 and 24 may transmit/receive information related to energy generation, distribution, storage, consumption, cost, reliability, emergency situation, and the like.

(1) Case where Second Component is One Component of HAN

The second component 62 may be an energy consumption component 26, e.g., a heater, motor, compressor, display or the like. In this case, the first component 61 may be a MICOM or energy consumption component 26 as an example. The MICOM or energy consumption component 26 may transmit a message for reducing energy consumption to another energy consumption component 26. Then, the another energy consumption component 26 may perform an operation for reducing energy, for example.

As another example, the energy consumption component 26 may be an electric home appliance. In this case, the first component 61 may be an energy storage component 23, an energy consumption component 26 (electric home appliance), an energy management component 24, an energy metering component 25, a central management component 27, a web server component 28, or a component that constitutes the UAN 10.

In this instance, an energy management function may be included or not included in the first component 61 except the energy management component 24.

In a case where an energy management function or solution is not included in the first component 61, it may be included in the communication unit or may be included in the MICOM of the second component 62. In this case, the energy management function is related to the consumption of energy.

As still another example, the second component 62 may be an energy generation component 21, an energy distribution component 22 or an energy storage component 23. In this case, the first component 61 may be an energy management component 24, a central management component 27, a web server component 28 or a component that constitutes the UAN 10.

A message may be transmitted to the second component 62. Here, the message may include energy generation time, generation amount or the like, energy distribution time, distribution amount or the like, and energy storage time, storage amount or the like.

In this instance, an energy management function may be included or not included in the first component 61 except the energy management component 24.

In a case where an energy management function or solution is not included in the first component 61, it may be included in the communication unit. In this case, the energy management function is related to the generation, distribution and storage of energy.

As still another example, the second component may be an energy metering component 25. In this case, the first component 61 may be a central management component 27, a web server component 28 or a component that constitutes the UAN 10.

An energy management function may be included or not included in the energy metering component. In a case where the energy management function is included in the energy metering component 25, the energy metering component 25 performs the same operation as the EMS.

In a case where an energy management function or solution is included in the energy metering component 25, it may be included in the communication unit or may be included in the second component 62.

As still another example, the second component 62 may be a central management component 27. In this case, the first component 61 may be a web server component 28 or a component that constitutes the UAN 10.

(2) Case where Second Component is One Component of UAN

The first component 61 may be a component that constitutes the UAN 10. In this case, the first and second components 61 and 62 may be the same kind of component or different kinds of components.

An energy management function may be included in the first component 61, the second component 62 or the communication unit.

The energy management function included in a specific component or the energy management function included in the energy management component 14 may be related to generation amount, distribution amount, storage amount, energy use amount of a component that constitutes the HAN 20.

In this specification, an example capable of constituting the network system has been described. However, any component not mentioned in this specification may be a first or second component that performs communication through the communication unit. For example, an automobile may be a second component, and the energy management component 24 may be a first component.

(3) Case where One of First and Second Components Communicates with Third Component Although the communication between two components has been described in the aforementioned examples, each of the first and second components may perform communication with one or more components (a third component to an n-th component).

In this case, the relation of the first or second component that performs communication with the third component and the like may be one of the aforementioned examples.

For example, the first component may be a component that constitutes the UAN, the second component may be an energy management component 24 that communicates with the first component, and the third component may be an energy consumption component 26 that communicates with the second component. In this instance, one or more of the three components may communicate with another component.

In this specification, the first to n-th components may be components that constitute the UAN or components that constitute the HAN. Alternatively, a portion of the components may be components that constitute the UAN, or another portion of the components may be components that constitute the HAN.

Hereinafter, third and fourth embodiments will be described. A difference between these embodiments and the aforementioned embodiments will be mainly described, and descriptions and reference numerals will be quoted to elements of these embodiments identical to those of the aforementioned embodiments.

Figure 8:
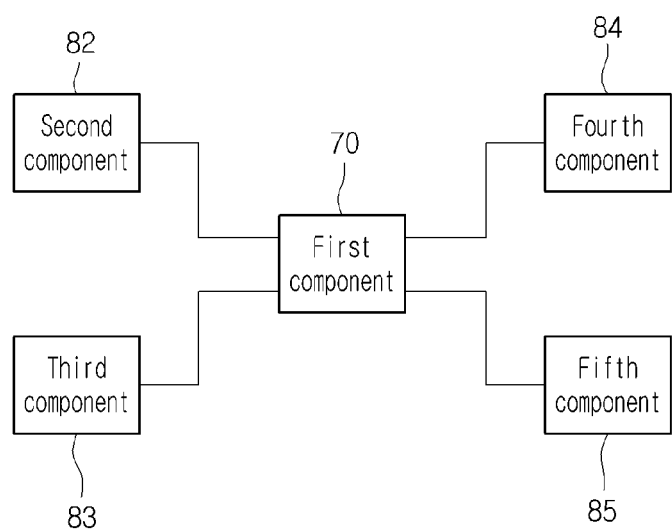
FIG. 8 is a view showing the communication structure of components that constitute the network system according to a third embodiment.
Figure 9:
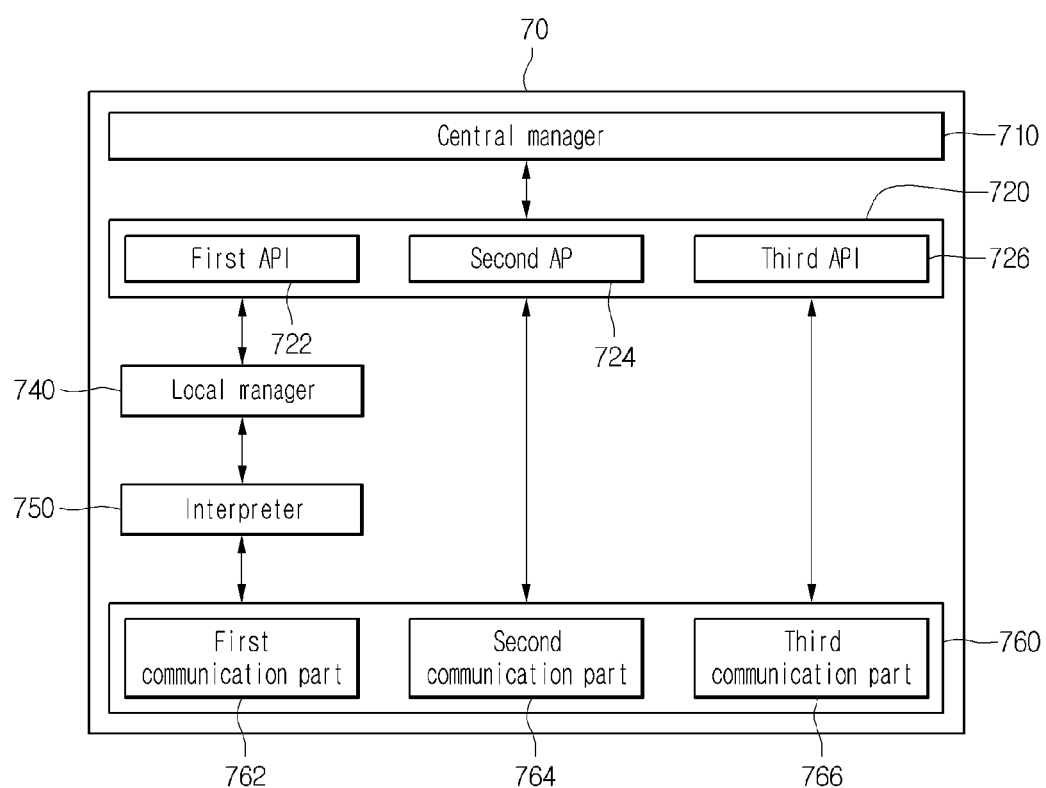
FIG. 9 is a block diagram showing the detailed configuration of a first component in FIG. 8.

FIG. 8 is a view showing the communication structure of components that constitute the network system according to a third embodiment. FIG. 9 is a block diagram showing the detailed configuration of a first component in FIG. 8.

Referring to FIGS. 8 and 9, a first component 70 may communicate with second to fifth components 82, 83, 84 and 85. Hereinafter, it will be described as an example that the first component 70 is a central management component (home server), the second and third components 82 and 83 are energy consumption components (electric home appliances), the fourth component 84 is an energy metering component (smart meter), and the fifth component 85 is a component that constitutes the UAN. The components may communicate with each other by means of a communication unit. In the network system illustrated in FIG. 8, each of the components is directly connected to the first component 70 to communicate with the first component 70. However, in a case where each of the components 82, 83, 84 and 85 is connected to new components to communicate with the new components, the network system may be extended and operated by the new components.

The second and third components 82 and 83 may be the same kind of component or different kinds of components. In this embodiment, it will be described as an example that the second and third components 82 and 83 are different kinds of energy consumption components.

The first component 70 may simply transmit information received from the fourth component 84 and/or the fifth component 85 to the second component 82 and/or the third component 83, or may process the received information and transmit the processed information.

The first component 70 may simply transmit information received from the second component 82 and/or the third component 83 to the fourth component 84 and/or the fifth component 85 (a signal may be converted), or may process the received information and transmit the processed information (the information is converted.

The first component 70 includes a communication unit 760 for performing communication with another component, a central manager 710 for managing the entire operation and/or information processing of the first component, and an application programming interface 720 (hereinafter, referred to as an API) for performing an interface between the communication unit 760 and the central manager 710 (specifically, application software).

The communication unit 760 includes a first communication part 762 for performing communication with the second and third components 82 and 83, a second communication part 764 for performing communication with the fourth component 84, and a third communication part 766 for performing communication with the fifth component 85.

In this instance, the first and second communication parts 762 and 764 may use different communication protocols from each other. As an example, the first communication part 762 may use Zigbee and the second communication part 764 may use Wi-fi. In this embodiment, the kind of communication protocol or method used by the first and second communication parts 762 and 764 is not limited. The third communication component 766 may use Internet communication as an example.

The API 720 includes a first API 722, a second API 724 and a third API 726. The third API 726 is an interface between the central manager 710 and the third communication part 766, and the first API 722 is an interface between the first communication part 762 and the central manager 710. The second API 724 is an interface between the second communication part 762 and the central manager 710.

The first component 70 further includes a local manager 740 and an interpreter 750. In a case where the information to be transmitted/received between the API 720 and the communication unit 760 is information related to operations of energy consumption components (electric home appliances), the local manager 740 outputs information corresponding to the respective energy consumption components. The interpreter 750 interprets information transmitted from the local manager 740 to the communication unit 760 or information received in the communication unit 760. The information outputted from the interpreter 750 is used to set or get values of information related to the respective energy consumption components.

The local manager 740 includes a memory (not shown) in which information related to one or more energy consumption components is stored. Alternatively, the local manager 740 may be connected to a memory in which information related to one or more energy consumption components is stored. The information related to each of the energy consumption components may include operation information of each of the energy consumption components and information for controlling the energy consumption components. The information related to each of the energy consumption components may further include software download information for operating each of the energy consumption components and information for remote controlling/monitoring.

As an example, in a case where a plurality of energy consumption components include a washing machine, a refrigerator and a cooking appliance, information related to each of the energy consumption components is stored in the memory. The information related to each of the energy consumption components may be changed as components connected to the network system are changed.

If a signal is transmitted from the API 720 to the local manager 740, information corresponding to a specific energy consumption component is outputted. In a case where a plurality of energy consumption components exist, information on the plurality of energy consumption components is outputted. The interpreter 750 interprets the information transmitted from the local manager 740 into a machine language so as to transmit the information to the energy consumption components. The machine language may be a signal used to set or get the operation information of the energy consumption components.

The information transmission process in the first component 70 will be described.

As an example, the first component 70 may receive energy information (e.g., an energy reduction signal: first command) from the forth component 45 through the second communication part 764. The received energy information is transmitted to the central manager 710 through the second API 724. In the process of information transmission between the second API 724 and the central manager 710, only a signal including the information is converted, and the content of the information is not converted.

Since the energy information is information related to the energy consumption reduction of the energy consumption components, the central manager 710 transmits information (second command) related to operations of the energy consumption components to the API 720. As an example, the central manager 710 transmits information necessary for turning off power of the washing machine or refrigerator.

Then, the information is transmitted from the first API 722 to the local manager 740.

The local manager 740 transmits information (third command) for controlling the operation of each of the energy consumption components to the interpreter 750 based on the information transmitted from the first API 722. As an example, in a case where the information transmitted from the first API 722 is information having different kinds of energy consumption components as targets, the local manager 740 transmits information related to the control of each of the energy consumption components to the interpreter 750. In this case, since the local manager 740 receives the second command and outputs the third command, the information inputted to the local manager 740 is converted and outputted by the local manager 740.

Subsequently, the interpreter 750 interprets the information transmitted from the local manager 740 into a machine language (signal). Then, the converted signal is transmitted to the target energy consumption components (second and third components) through the first communication part 762. Then, the energy consumption components (second and third components) are finally turned off so as to reduce energy.

Although it has been described above that the first component receives information through the second communication part, the first component may receive information through the third component so that the information related to the energy consumption components is outputted.

Meanwhile, the second and third components 82 and 83 may transmit their own operation information to the first component 70. Since the information transmitted from the second and third components 82 and 83 is information related to operations of the energy consumption components, the signal received in the first communication part 762 is transmitted to the central manager 710 via the interpreter 750, the local manager 760 and the first API 722. In such an information transmission process, the information related to the second and third components 82 and 83 is stored in the local manager 740. In this embodiment, since the information related to the energy consumption components is stored in the local manager, the local manager may be understood as a virtual energy consumption component (abstraction model).

The central manager 710 may transmit the received information to the second communication part 764 and/or the third communication part 766.

The operation of the first component will be described. The information received through the communication unit 760 may be transmitted directly to the API 720, or may be converted (via the interpreter and the local manager) and then transmitted to the API 720, based on the kind of information (or the type of signal).

The information transmitted from the central manager 740 may be transmitted directly to the communication unit 760, or may be converted and then transmitted to the communication unit 760.

As another example, the interpreter may be included in the local manager 740, and the information received through the communication unit 760 is transmitted to the local manager 740. However, converted information may be outputted, or information may be outputted as it is without converting the information.

Meanwhile, in a case where the information transmitted to the API 720 through the second or third communication part 764 or 766 is information (raw data or refined data) related to time-based pricing, the central manager 710 determines the presence of on-peak time. In the case of the on-peak time, the central manager 710 may transmit the information (first command) for controlling the operations of the energy consumption components to the API 720. Then, the information is converted through the local manager 740, and the converted information (second command) is transmitted to the energy consumption components through the first communication part 762. Alternatively, the central manager 710 may transmit the information related to the time-based pricing to the first communication part 762 through the second API 724 without determining the presence of on-peak time. In this case, the information may be converted or not converted. That is, in a case where the central manager directly receives first information (raw data), it may transmit the first information as it is, or convert the first information into a second information (refined data) and then transmit the second information.

Figure 10:
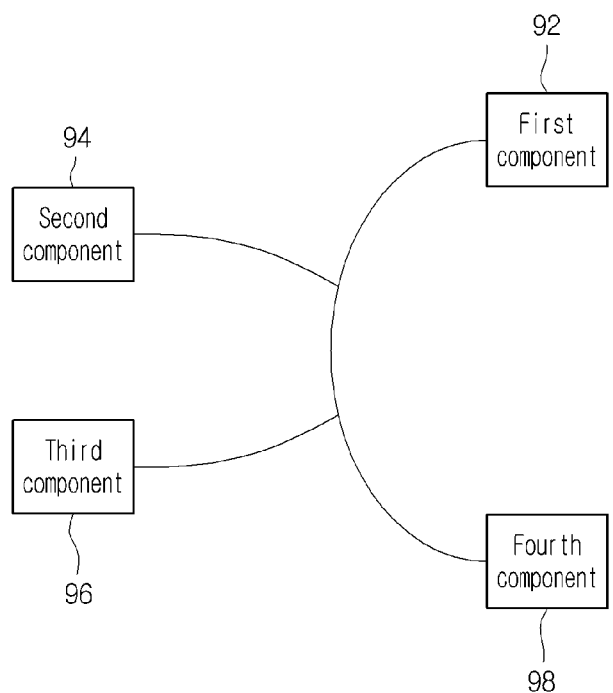
FIG. 10 is a view showing the communication structure of components that constitute the network system according to a fourth embodiment.
Figure 11:
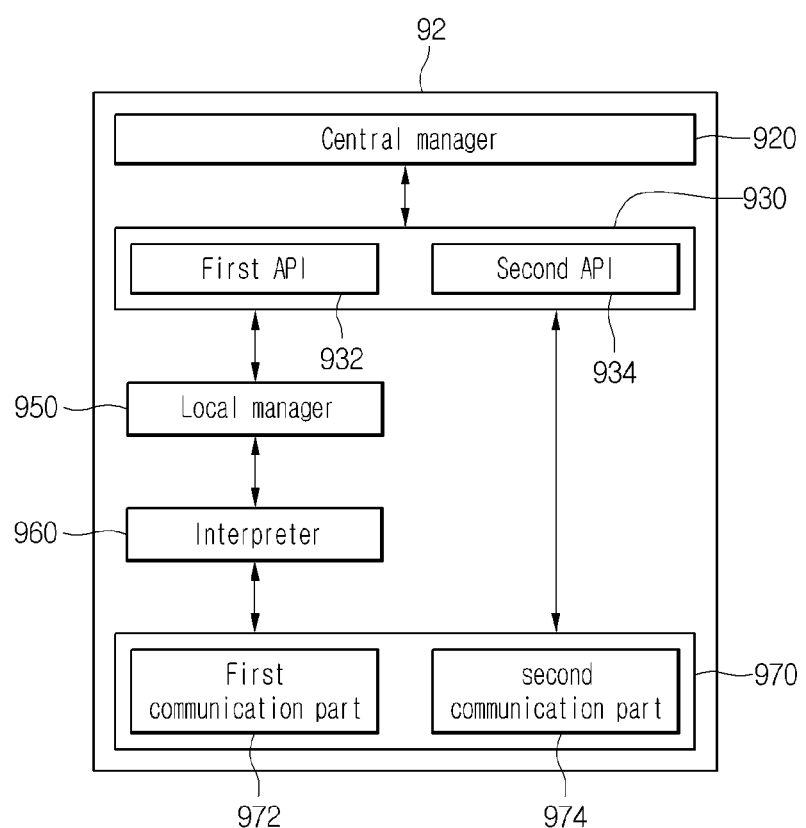
FIG. 11 is a block diagram showing the detailed configuration of a first component in FIG. 10.

FIG. 10 is a view showing the communication structure of components that constitute the network system according to a fourth embodiment. FIG. 11 is a block diagram showing the detailed configuration of a first component in FIG. 10.

Referring to FIGS. 10 and 11, the network system of this embodiment may include at least first to fourth components 92, 94, 96 and 98.

The first component 92 may communicate with the second to fourth components 94, 96 and 98. The fourth component 98 may communicate with the first to third components 92, 94 and 96.

Hereinafter, it will be described as an example that the first component 92 is a central management component (home server), the second and third components 94 and 96 are energy consumption components (electric home appliances), and the fourth component 98 is an energy metering component (smart meter).

The central management component (home server) may be understood as a component necessary for controlling at least a component that constitutes the HAN 20.

The first component 92 includes a communication unit 970 for performing communication with another component, a central manager 920 for managing the entire operation and/or information transmission/reception of the first component 92, and an application programming interface 930 (hereinafter, referred to as an "API") that serves as an interface between the communication unit 970 and the central manager 920 (specifically, application software).

The communication unit 970 may include a first communication component 972 for performing communication with the second to fourth components 94, 96 and 98, and a second communication component 974 for performing Internet communication.

The API 930 includes a first API 932 and a second API 934. The second API 934 is an interface between the central manager 920 and the second communication part 974, and the first API 930 is an interface between the first communication part 972 and the central manager 920.

The first component 92 further includes a local manager 950 and an interpreter 960. In a case where the information to be transmitted/received between the API 932 and the communication unit 970 is information related to operations of energy consumption components (electric home appliances), the local manager 950 outputs information corresponding to the respective energy consumption components. The interpreter 960 interprets information transmitted from the local manager 950 to the communication unit 970 or information received in the communication unit 970.

In this embodiment, the functions of the interpreter and the local manager are identical to those of the third embodiment, and therefore, their detailed descriptions will be omitted.

The information transmission process in the first component 92 will be described.

As an example, the first component 92 may receive energy information (e.g., energy reduction signal) from the fourth component 98 through the first communication part 972. Alternatively, the first component 92 may receive energy information from an external component connected to Internet through the second communication part 974.

The received energy information is transmitted directly to the first or second API 932 or 934 and then transmitted to the central manager 920. Since the energy information is information related to the energy consumption reduction of the energy consumption components, the central manager 920 transmits information related to the operations of the energy consumption components to the first API 932. As an example, the central manager 920 transmits information necessary for turning off power of a washing machine or refrigerator.

Then, the information is transmitted from the first API 932 to the local manager 950.

The local manager 950 transmits information for controlling the operation of each of the energy consumption components to the interpreter 960 based on the information transmitted from the first API 932. As an example, in a case where the information transmitted from the first API is information related to different kinds of energy consumption components, the local manager 950 transmits information related to the control of each of the energy consumption components to the interpreter 960.

Subsequently, the interpreter 960 interprets the information transmitted from the local manager 960 into a machine language (signal). Then, the interpreted signal is transmitted to the energy consumption components through the first communication part 972. Then, the energy consumption components are finally turned off so as to reduce energy.

Meanwhile, the second and third components 94 and 96 may transmit their own operation information to the first component 92. Since the information transmitted from the second and third components is information related to the operations of the energy consumption components, the signal received in the first communication part 972 is transmitted to the central manager 920 via the interpreter 960, the local manager 950 and the first API 932. In such an information transmission process, the information related to the first and second components is stored in the local manager 950.

The central manager 920 may transmit the received information to the first communication part 972. Then, the information of the second and third components 94 and 96 is transmitted to the fourth component 98.

The operation of the first component will be described. The information received through the communication unit 970 may be transmitted directly to the API 930, or may be converted (via the interpreter and the local manager) and then transmitted to the API 930, based on the kind of information (or the type of signal).

On the contrary, the information transmitted from the central manager 920 may be transmitted directly to the communication unit 970, or may be converted and then transmitted to the communication unit 970.

Meanwhile, in a case where the information transmitted to the API 930 through the second communication part 974 is information related to time-based pricing, the central manager 920 determines the presence of on-peak time. In the case of the on-peak time, the central manager 920 may transmit the information for controlling the operations of the energy consumption components to the API 930. Then, the information is transmitted to the energy consumption components through the local manager, the interpreter and the first communication part. In this case, the first component may be understood as an energy management component.

Although it has been described above that two energy consumption components communicate with the first component, the number of energy consumption components that communicate with the first component is not limited.

Although it has been described as an example that the first component is a home server, the first component may be an energy management component. In this case, the fourth component may be a central management component, an energy management component, a smart meter, or the like.

As another example, the first component may be a smart meter. In this case, the fourth component may be a central management component, an energy management component, or the like.

As still another example, the first component may be a terminal component (e.g., a gate way).

As still another example, each of the second and third components may be an energy generation component, an energy storage component or the like, which constitutes the HAN. That is, one or more of the energy generation component, the energy consumption component and the energy storage component may communicate with the first component. In addition to information related to the energy consumption component, information related to the energy generation component (e.g., information related to the operation of the energy generation component) and information related to the energy storage component (e.g., information related to the operation of the energy storage component) may be stored in the memory included in a local network or connected to the local network.

Although it has been described above that the first component performs Internet communication, the Internet communication may not be performed.

Although it has been described in the first embodiment that a single local manager is provided, a plurality of local managers may be provided. As an example, a first local manager may process information on an electric home appliance such as a refrigerator or washing machine, and a second local manager may process information on a display product such as a television or monitor.

Figure 12:
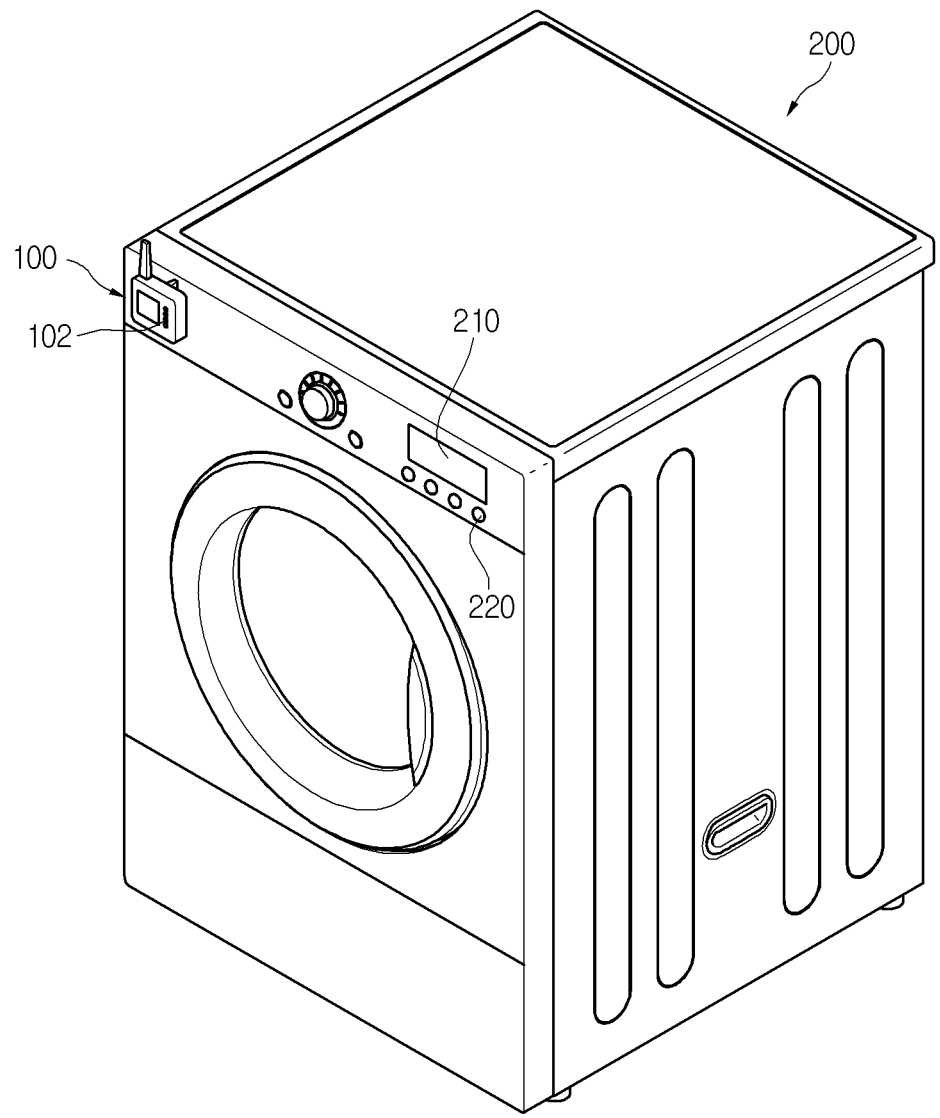
FIG. 12 is a perspective view of an electrical appliance which is an example of a component constituting a network system according to an embodiment.

FIG. 12 is a perspective view of an electrical appliance which is an example of a component constituting a network system according to an embodiment.

Referring to FIG. 12, a network system according to the current embodiment includes an electrical appliance 200 as an energy consumption component and a communication unit 100 communicating with the electrical appliance 200. The communication unit 100 may be built in the electrical appliance 200, separately connected to the electrical appliance 200, or disposed within a distance which is capable of communicating with the electrical appliance 200. Also, when the communication unit 100 is spaced within the distance which is capable of communicating with the electrical appliance 200, the communication unit may be connected to the electrical appliance 200 in a wire or wireless manner.

The electrical appliance 200 may include an appliance input part 220 for inputting a predetermined command and a display part 210 for displaying an operation state of the electrical appliance 200 or contents inputted through the appliance input part 220.

The communication unit 100 may allow the electrical appliance 200 to communicate with one component (for example, one of an energy generation component, an energy distribution component, an energy storage component, an energy measurement component, and the other energy consumption component) except for the electrical appliance 200.

The communication unit 100 may confirm whether the utility network 10 or the home area network 20 is connected before the communication.

Hereinafter, for example, the confirmation of whether the communication unit 100 communicates with the electrical appliance 200 will be described.

The communication unit 100 includes a communication input part 102 for inputting a predetermined command to perform communication with the electrical appliance 200. When a user manipulates the communication input part 102, the communication unit 100 may recognize whether the electrical appliance 200 is connected. On the other hand, when a power is applied into the electrical appliance 200, the communication unit 100 may automatically recognize the electrical appliance 200 and be set to a communicable state.

The communication unit 100 may be provided as a module detachably disposed on the electrical appliance 200. When the communication unit 100 is mounted on the electrical appliance 200, the communication unit 100 may recognize the electrical appliance 200. When the communication unit 100 recognizes the electrical appliance 200, the communication unit 100 may confirm whether the communication unit 100 is enabled to communicate with the electrical appliance 200 through a predetermined confirmation process. Even though the communication unit 100 recognizes the electrical appliance 200, the communication for transmitting information may not be smoothly performed. At this time, the predetermined confirmation process may be understood as a process for confirming the non-smooth communication.

Whether the communication unit 100 is enabled to communicate with the electrical appliance 200 may be confirmed through whether a predetermined message (command or information) is transmitted/received therebetween. For example, the communication input part 102 of the communication unit 100 or the appliance input part 220 of the electrical appliance 220 may be manipulated to confirm the transmission/reception between the communication unit 100 and the electrical appliance 200 through whether the predetermined message is displayed on each of the display parts of the communication unit 100 and the electrical appliance 200.

Another embodiment will be proposed.

Energy information may be previously stored in the electrical appliance 200. For example, the electrical appliance 200 may be connected to a portable storage medium (USB) or a web server to periodically update the energy information.

If the communication unit 100 and the electrical appliance 200 are not connected to each other or does not communicate therebetween, the electrical appliance 200 may perform an operation for saving a power or reducing an electricity charge on the basis of the previously stored energy information.

Figure 13:
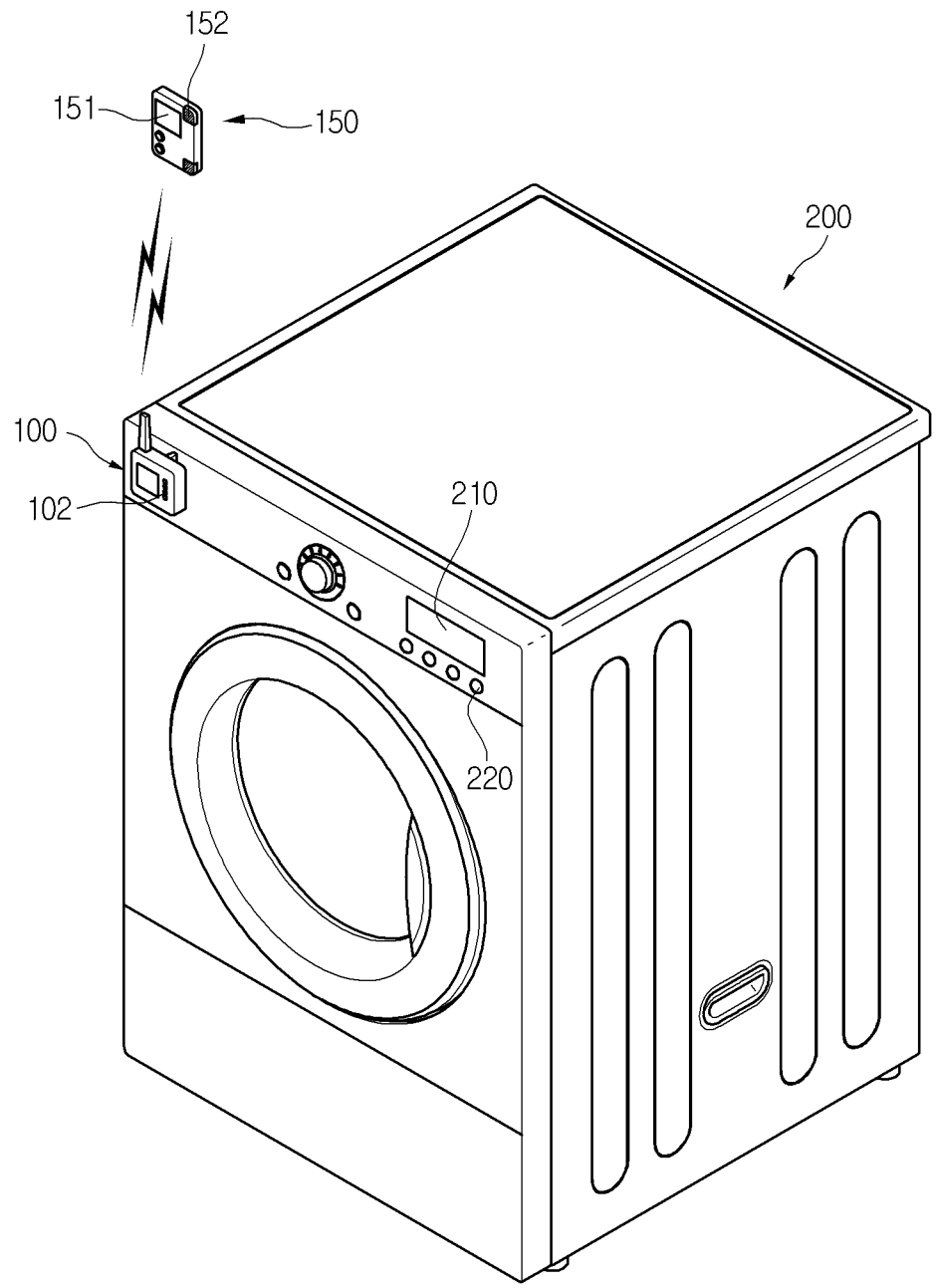
FIG. 13 is a view of a network system to which a network registration device is applied according to an embodiment.

FIG. 13 is a view of a network system to which a network registration device is applied according to an embodiment.

Referring to FIG. 13, the network system according to the current embodiment includes a network registration device 150 for registering an non-registered electrical appliance on the network (the utility network or the home area network).

When the communication unit 100 and the electrical appliance 200 are connected to each other to communicate therebetween, the electrical appliance 200 may be registered on the network through the network registration device 150.

The network registration device 150 includes a display part 151 for displaying information related to the registration of the electrical appliance 200. The information related to the registration of the electrical appliance 200 may include a home code defined as an identification code of each home in which the electrical appliance is used, an appliance code defined as an identification code for recognizing one kind of electrical appliance 200, and an unique identification code for distinguishing the same kind of appliances.

Also, the network registration device 150 may further include an input part 152 for inputting a command related to the registration of the electrical appliance 200. The network registration device 150 may perform an initialization operation for communicating with the communication unit 100 through the manipulation of the input part 152. The initialization operation may be performed through the communication input part 102. The network registration device 150 may further include a communication part (not shown) communicating with the communication unit 100.

The registration process of the electrical appliance 200 will be described simply.

The initialization operation for the communication between the communication unit 100 and the network registration device 150 is performed using an initialization button disposed on the communication input part 102 or the input part 152. The information related to the electrical appliance 200 is transmitted into the network registration device 150 through the communication unit 100. The network registration device 150 transmits the information related to the electrical appliance 200 into a component disposed in the home area network 20, i.e., the energy management component 24, the energy measurement component 25, or a central management component 27. The energy management component 24, the energy measurement component 25, or the central management component 27 may confirm whether the received information related to the electrical appliance is previously registered information.

If the received information is the previously registered information, the energy management component 24, the energy measurement component 25, or the central management component 27 informs a fact in which the received information is the previously registered information into the network registration device 150. Thus, the display part 151 of the network registration device 150, the display part 210 of the electrical appliance 200, or the display part of the communication unit 100 may display the informed information.

If the received information is non-registered information, the energy management component 24, the energy measurement component 25, or the central management component 27 accords the home code, the appliance code, or the unique identification code to the electrical appliance 200. The electrical appliance 200 may be registered on the network system through the above-described process.

Another embodiment will be proposed.

Although the separate network registration device 150 is provided to allow the electrical appliance 200 to communicate with the energy management component 24 in the current embodiment, the present disclosure is not limited thereto. For example, the electrical appliance 200 may communicate with the energy management component 24 through the communication unit 100. That is, the energy management component 24 may serve as the network registration device.

Another embodiment will be proposed.

While the initialization operation for the communication between the communication unit 100 and the network registration device 150 is performed, the communication unit 100 may be reset. That is, when the communication unit 100 is provided as the detachable module to previously serve as a communication device for the other electrical appliance, information stored in the communication unit 100 may be deleted.

After the communication unit 100 is reset, information of a newly registered electrical appliance may be stored in the communication unit 100.

Figure 14:
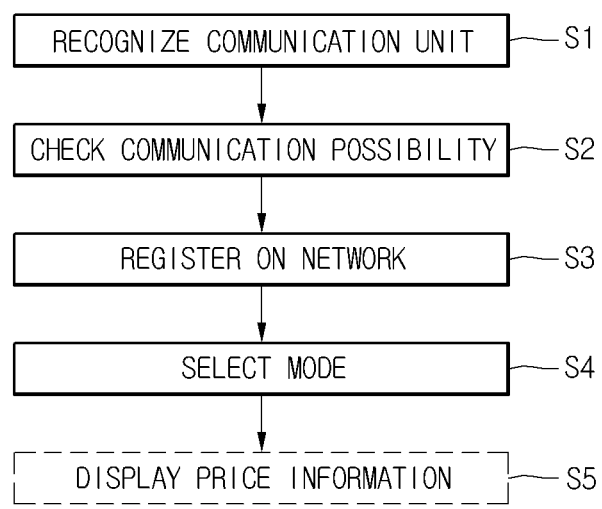
FIG. 14 is a flowchart illustrating a method of controlling an electrical appliance according to a first embodiment.

FIG. 14 is a flowchart illustrating a method of controlling an electrical appliance according to a first embodiment.

Referring to FIG. 14, a process for operating the electrical appliance in a predetermined mode for saving a power after the electrical appliance is registered on the network system will be described.

When it is recognized that the communication unit 100 is connected to the electrical appliance 200, a communicable state between the communication unit 100 and the electrical appliance 200 is checked (S2).

When the communicable state between the communication unit 100 and the electrical appliance 200 is confirmed, the electrical appliance 200 is registered on the network system through transmission/reception of information between the communication unit 100 and the network registration device 150 and between the communication unit 100 and the energy management component 24, the energy measurement component 25, or the central management component 27.

When the electrical appliance 200 is registered on the network system, the electrical appliance 200 may transmit or receive information into/from the other component constituting the utility network 10 or the home area network 20 and be controlled in operation by a specific component (S3). In the state where the electrical appliance 200 is registered on the network system, a specific mode for operating the electrical appliance 200 may be selected.

The specific mode may include a power saving mode which is controlled in operation on the basis of the energy information. The power saving mode may include a plurality of power saving modes. For example, the plurality of power saving modes may include a first power saving mode and a second power saving mode.

The first power saving mode includes a process of inputting first information which should be determined for operating the electrical appliance 200 and a process of operating the electrical appliance through a user interface according to energy-related information corresponding to the first information. Here, the first information includes information related to an operation method (course) or an operation time which are adequate for characteristics of the electrical appliance 200. Also, the energy-related information may include an operation method (or time) which can be selected for reducing a power or electricity charge when the electrical appliance 200 is operated according to the selected first information.

In detail, when the user inputs the first information for operating the electrical appliance 200, the electrical appliance 200 may display the energy-related information corresponding to the first information.

A case in which the electrical appliance is a washing machine will be described as an example. When the user selects a washing course taken for one hour, the energy-related information, for example, an electricity charge or power consumption amount corresponding to the washing course for each time may be displayed. For example, information in which an electricity charge of about 500 Won is required when a washing course operated for 11 a.m. to 12 a.m. is selected, an electricity charge of about 800 Won is required when a washing course operated for 12 a.m. to 13 p.m. is selected, and an electricity charge of about 1,000 Won is required when a washing course operated for 13 p.m. to 14 a.m. is selected may be displayed. Here, the information related to the electricity charge may exist as scheduled data or receive real-time data from the energy management component 24 or the energy measurement component 25.

A case in which the electrical appliance is a cooking appliance will be described as an example. The cooking appliance may include a power consumption device for cooking, for example, a bake heater, a convection heater, a convection fan, or a broil heater. When the user selects a preheat temperature and preheat time for cooking foods, energy-related information, for example, an electricity charge or power consumption amount for each output mode may be displayed. For example, one selected from a high output mode in which a power of about 4,000 W is consumed when the broil heater and the bake heater are alternately operated for a predetermined time, a middle output mode in which a power of about 2,500 W is consumed when the broil heater and the bake heater are alternately operated for a predetermined time, and a low output mode in which a power of about 2,080 W is consumed when the broil heater and the bake heater are operated at the same time for a predetermined time may be displayed.

The user may select a required time zone (the washing machine) or output mode (the cooking appliance) on the basis of the energy-related information. Also, the electrical appliance may be operated according to the selected information. The first power saving mode may be called a "manual power saving mode".

The second power saving mode includes a process of inputting the first information which should be determined for operating the electrical appliance 200 and a process for operating the electrical appliance to save a power according to energy-related information corresponding to the first information. In detail, when the user inputs the first information for operating the electrical appliance 200, the electrical appliance 200 may be automatically operated according to the energy-related information corresponding to the first information. That is, when the first information is input, the energy management component 24, the energy measurement component 25, the central management component 27, or a control part of the electrical appliance 200 recognize the first information to compare the recognized first information to the energy-related information. Also, when the electrical appliance 200 is operated according to the first information, an optimized operation method or time for reducing the power consumption or the electricity charge may be determined. Then, the operation of the electrical appliance 200 may be controlled according to the determined operation method or time. The second power saving mode may be called an "automatic power saving mode".

Only one mode may be previously set in the electrical appliance 200. That is, the first power saving mode or the second power saving mode may be programmed with a name of "power saving mode". In this case, the user may activate the mode by manipulating a predetermined input part (e.g., a power saving mode input part) for performing a preset mode, but is not selected.

The specific mode may further include a normal mode for operating the electrical appliance according to the first information. The normal mode may be called a "manual mode".

When the user selects the normal mode, the electrical appliance 200 may be set to an operation course or time according to user's intention regardless of the energy-related information and then be operated according to the set operation course or time. For example, even though a time point or period at which the electrical appliance 200 is operated correspond to expensive time point or time, the electrical appliance 200 may be operated regardless of the expensive time point or time.

The electrical appliance 200, the energy management component 24, the energy measurement component 25, or the central management component 27 may include a predetermined input part for selecting the power saving mode or the normal mode.

When the user selects the power saving mode, a content for selecting the first or second power saving mode may be displayed. Thus, the user may select one of the first and second power saving modes.

The electrical appliance 200 may be set to one of the power saving mode (the first and second power saving modes) and the normal mode. For example, the electrical appliance 200 may be set to the power saving mode as a standard mode. In this case, the input part may be manipulated to change the power saving mode into the normal mode. On the other hand, when the electrical appliance 200 is set to the normal mode as the standard mode, the input part may be manipulated to change the normal mode into the power saving mode.

The standard mode of the electrical appliance 200 may not be previously set. In this case, an interface (e.g., a display) for requesting the selection of one mode of the normal mode or the power saving mode may be realized in the electrical appliance 200, the energy management component 24, the energy measurement component 25, or the central management component 27. Also, the user may select the power mode or the normal mode through the interface (e.g., the manipulation of the input part) or select the first or second power saving mode of the power saving mode.

Although the user selects one mode, the one mode may be changed into the other mode later (S4).

When the mode selection process (S4) of the electrical appliance 200 is finished, a process of displaying price information according to the selected mode may be performed (S5). However, the process of displaying the price information may be performed when the first power saving mode of the specific mode is selected.

When the power saving mode is selected, and thus the electrical appliance 200 is operated in the power saving mode, a display for displaying the performance of the power saving mode or the normal mode may be realized in the electrical appliance 200, the energy management component 24, the energy measurement component 25, or the central management component 27.

Also, a method of displaying whether the power saving mode or the normal mode is operated may include a display method using a predetermined level or graph.

Hereinafter, a second embodiment will be described. The second embodiment is the same as the first embodiment except for an order of a control method. Thus, their different points may be mainly described, and also, the same parts as those of the first embodiment will be denoted by the same description and reference numeral.

Figure 15:
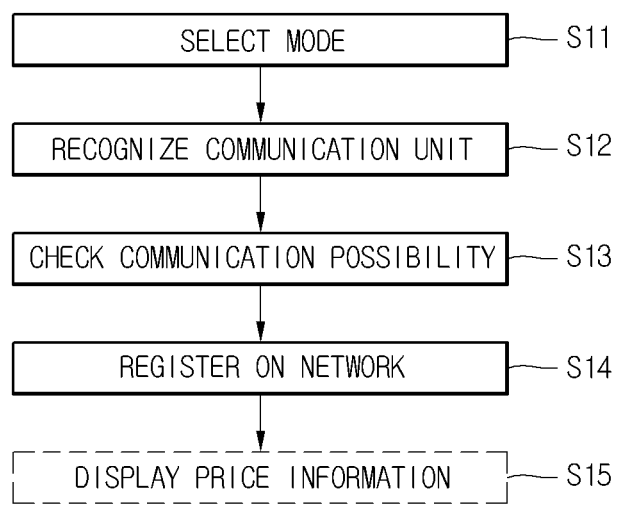
FIG. 15 is a flowchart illustrating a method of controlling an electrical appliance according to a second embodiment.

FIG. 15 is a flowchart illustrating a method of controlling an electrical appliance according to a second embodiment.

Referring to FIG. 15, in a method of controlling an operation of an electrical appliance 200, a mode selection process may be preferentially performed (S11). After the above-described mode selection process is performed, a communication unit recognition process (S12), a communicability check process (S13), a network registration process (S14) may be successively performed.

Although the operation mode of the electrical appliance 200 is selected into the power saving mode in the mode selection process (S11), when a communication unit is not recognized or communication is impossible, a fact in which the power saving mode is not performed may be informed by the user. In this case, the electrical appliance 200 may be operated in a normal mode. Also, when the specific mode is selected into a first power saving mode, the communication unit is recognized, the communication is possible, and the network registration is normal, energy-related information (e.g., price information) may be displayed (S15).

Figure 16:
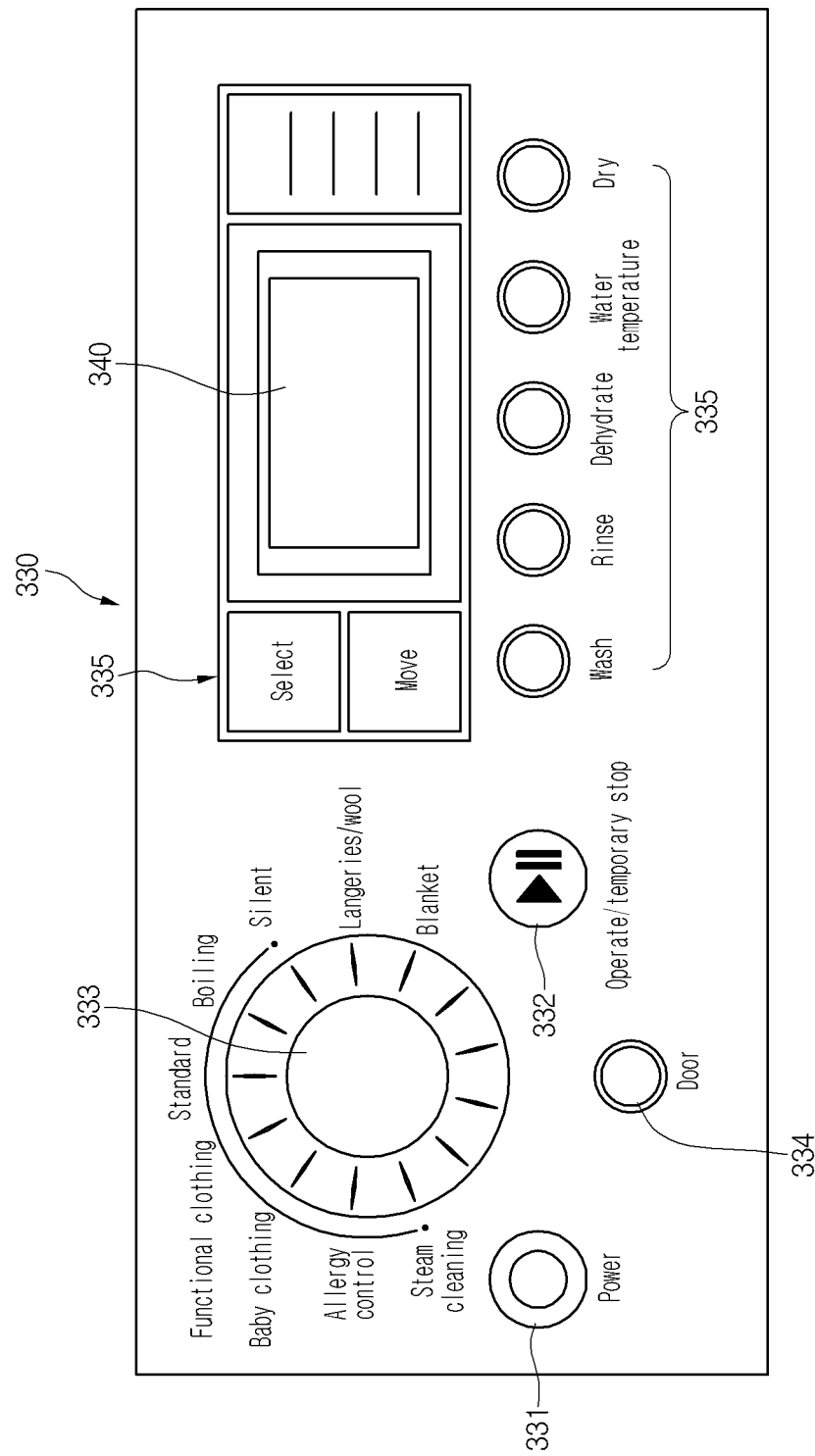
FIG. 16 is a detailed view illustrating a control panel of an electrical appliance according to a third embodiment.

FIG. 16 is a detailed view illustrating a control panel of an electrical appliance according to a third embodiment.

FIG. 16 illustrates a control panel of a washing machine which is an example of an electrical appliance.

Referring to FIG. 16, a control panel 330 of a washing machine may include a power button 331 for turning the washing machine on/off, an operation button 332 for starting or temporally stopping an operation of the washing machine or re-operating the washing machine, a mode or course selection part 333 (hereinafter, referred to as a "course selection part") for selecting an operation course or mode, a function selection part 335 including a plurality of buttons to select a function desired by a user, a display part 340 for displaying an selected item, the progress of a corresponding course (mode), and a remaining time when the function selection part 335 is manipulated, and a control part (not shown) for controlling the above-described parts. Energy information or additional information may be displayed on the display part 340. In the current embodiment, the function selection part 335 and the course selection part 333 may be commonly called an "input part".

Hereinafter, information displayed on the display part 340 when the washing machine is operated will be described. Particularly, a case in which energy-related information is displayed on the display part 340 will be described as an example.

Figure 17:
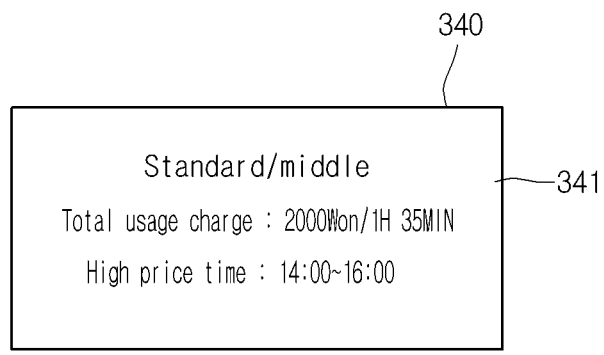
FIGS. 17 to 19 are views illustrating an example of a screen displayed on a display part of a washing machine.
Figure 18:
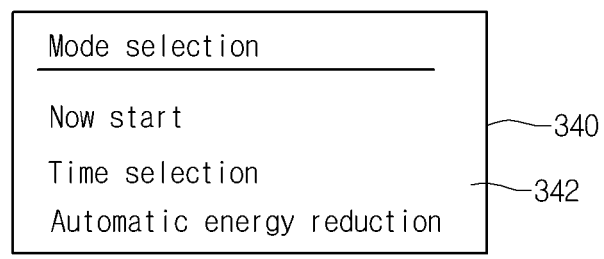
Figure 19:
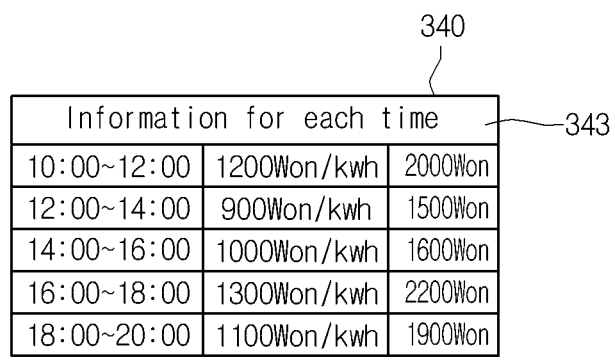

FIGS. 17 to 19 are views illustrating an example of a screen displayed on a display part of a washing machine.

Referring to FIGS. 17 to 19, when a user selects the power button 331 to turn the washing machine on, the washing machine receives, for example, electricity charge information through a communication unit. If the washing machine receives scheduled information that is actual charge information, the control part may divide the actual charge information into a plurality of time periods. An electricity charge within each of the divided time periods may be, for example, set to a mean value of electricity charges within the time period.

On the other hand, when the washing machine receives time of use (TOU) information that is real-time information, the received information may be stored to divide the TOU information into a plurality of time periods by using electricity charge information at last day or week. Here, the electricity charge information may be received from one of an energy management component 24, an energy measurement component 25, and a central management component 27.

When the user selects a course by using a course selection part 333 and a water temperature by using a water temperature button, as shown in FIG. 17, a screen 341 (hereinafter, referred to as a "first screen") for informing the selected course (e.g., a standard course) and a water temperature (middle of high, middle, and low) is displayed on the display part 340.

Also, the total electricity charge (or the total power consumption amount) from the current time until the selected course is finished and/or a time (or a course performance time) remaining until the course is finished may be displayed on the first screen 341. Also, a high price time zone may be displayed on the first screen 341. Here, when the time (or the course performance time) remaining until the course is finished is previously set for each course to select the course, the course may be displayed on the display part 340. Then, a bubble amount may be detected to change the time remaining until the course is finished into an actual remaining time (or a course performance time). However, when the remaining time is changed, the total electricity charge when the course is performed may be changed.

A reason in which the high price time information is displayed on the first screen 341 is for comparing the current time to the high price time information to determine whether the user operates the washing machine at present. For example, when the current time corresponds to the high price time period, the user may operate the washing machine by getting out of the high price time period. When the washing machine is operated by getting out of the high price time period, the user may operate the washing machine after getting out of the high price time period or select a desired function or time period by using a mode selection screen that will be described later.

The user may select the operation button 332 on the first screen 341 to start the selected course now. On the other hand, when the user selects a movement button that is one of the function selection part 335, the first screen 341 is converted into a mode selection screen 342 (hereinafter, referred to as a "second screen) as shown in FIG. 18.

A just time menu for starting an operation of the washing machine now, a time selection menu for selecting a time desired by the user, and an automatic energy reduction menu for automatically reducing energy consumption are displayed on the second screen 342.

The user may select the movement button to move the menus therebetween. Also, the user may select a selection button that is one of the function selection part 335 in a specific menu to select the specific menu. When the user selects a just start menu, the washing machine may perform the selected course now. When the user selects the time selection menu, the second screen is converted into a charge information screen 343 for each time (hereinafter, referred to as a "third screen) as shown in FIG. 19.

An electricity charge per unit time for a specific time period and the total electricity charge when a course selected in the specific time period is finished may be displayed on the third screen 343. In the current embodiment, a mode for selecting a time by selecting the time selection menu may be called a manual power saving mode (a manual power saving function).

Thus, the user may confirm information displayed on the third screen 343 to select a specific time period. If the current time is 10:10 a.m., and the user selects a time period (substantially, a time period from 12 a.m. to 14 p.m.) corresponding to 12 a.m., the course may be set and scheduled to the selected time, and the washing machine may be automatically operated during the selected time period to perform the selected course.

If a time (e.g., one hour and a half) for performing the selected course is less than the specific time period (e.g., 2 hours), the washing machine may be operated at a starting time (e.g., at 12:00 a.m.) of the specific time period. Also, if a time (e.g., two hours and a quarter) for performing the selected course is greater than the specific time period (e.g., 2 hours), an operation time of the washing machine may be set so that a large amount of the time for performing the selected course is included within a low price time period.

For example, when the user selects a time period included in 12:00 a.m., a specific course (e.g., two hours and a quarter) may be set so that the operation of the washing machine starts at 12:00 and is ended at 14:15. For another example, when the user selects a time period included in 14:00 p.m., a specific course may be set so that the operation of the washing machine starts at 11:45 and is ended at 14:00. Also, when the user selects a time period in which an electricity charge is maximized, although not shown, an alarm message may be displayed.

When the automatic energy reduction menu is selected on the second screen 342, a course selected in a minimum charge time zone may be performed. As described above, when the automatic energy reduction menu is selected, if a time (e.g., two hours and a quarter) for performing the selected course is greater than the specific time period (e.g., 2 hours), the operation time of the washing machine may be set so that a large amount of the time for performing the selected course is included within the low price time period. On the other hand, when a standard charge is set by the user, the washing machine may be operated at the fastest time in a time period in which an electricity charge is less than the standard charge.

In the current embodiment, when the washing machine processes the electricity charge information, or the automatic energy reduction menu is selected, the minimum charge time zone may be automatically selected. Thus, it may be understood that the washing machine includes the energy management function. Also, when the automatic energy reduction menu is selected, it may be understood that an automatic power saving function is selected.

According to the current embodiment, since the electricity charge information is displayed to select the time period in which the electricity charge is relatively inexpensive, or the automatic energy reduction mode is selected, the electricity charge may be reduced.

When electricity within an inexpensive charge time period is used for a consumer, concentration of power demand and supply may be solved. The power supplier may effectively manage the power demand and supply.

Since an electricity charge is priced high in a time period in which power demand is high, when use of electricity is increased in a time period in which the electricity charge is low, the concentration of the power demand may be solved.

Although various courses and functions are selected by the function selection part and the course selection part, the present disclosure is not limited thereto. For example, the display part may include a touch screen for selecting various functions through a touch method. In this case, the touch screen may perform the function of the input part.

Although the course remaining time (or the course performance time) is displayed before an amount of bubble is detected when a course is selected in the current embodiment, the present disclosure is not limited thereto. For example, the course remaining time (or the course performance time) according to the amount of bubble may be displayed on the first screen after the amount of bubble is detected. A process after the first screen is displayed is the same as that described above.

Also, although the screen displayed on the display part of the energy consumption component is described in the above-described embodiment, the present disclosure is not limited thereto. For example, the display part may be provided to an energy management component, an energy measurement component, or a central management component to display the above-described screen and select a manual mode or an automatic mode (an automatic energy reduction mode or an automatic electricity charge reduction mode). Here, the same screen may be displayed on the energy consumption component.

Figure 20:
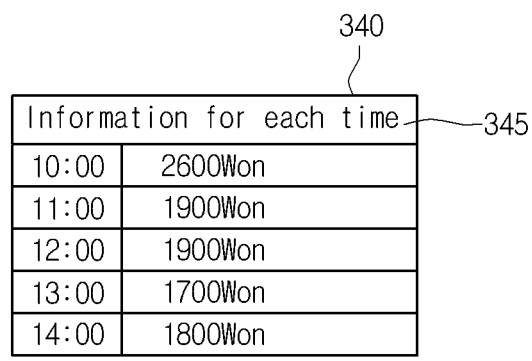
FIG. 20 is a view illustrating another example of a screen of charge information for each time displayed on the display part of the washing machine.

FIG. 20 is a view illustrating another example of a screen of charge information for each time displayed on the display part of the washing machine.

Referring to FIG. 20, the total electricity charge according to a course start time may be displayed on a screen 345 (a third screen) for each time. Thus, a user may select a start time after charge information is confirmed.

Figure 21:
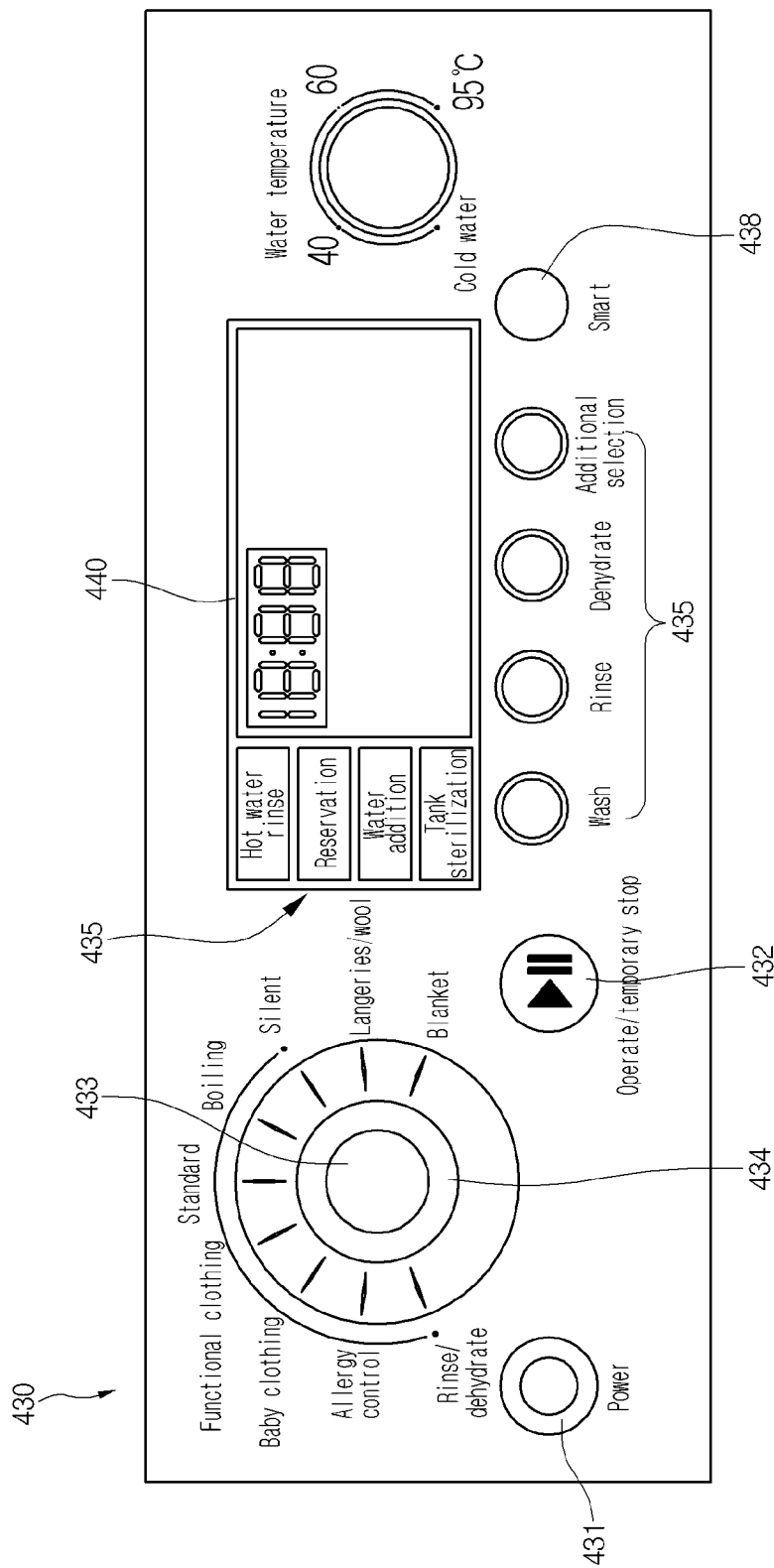
FIG. 21 is a detailed view illustrating a control panel of an electrical appliance according to a fourth embodiment.

FIG. 21 is a detailed view illustrating a control panel of an electrical appliance according to a fourth embodiment.

FIG. 21 illustrates a control panel of a washing machine which is an example of an electrical appliance.

Referring to FIG. 21, a control panel 430 of a washing machine may include a power button 431 for turning the washing machine on/off, an operation button 432 (also, referred to as a start button) for starting or temporally stopping an operation of the washing machine or re-operating the washing machine, a course or mode selection part 433 (hereinafter, referred to as a "course selection part") for selecting an operation course or mode, a function selection part 435 including a plurality of buttons to select a function desired by a user, and a display part 440 for displaying an selected item, the progress of a corresponding course (mode), and a remaining time when the function selection part 435 is manipulated. The course selection part 433 may be rotated, for example, together with a knob.

The function selection part 435 may include at least smart button 438. A smart function (a power saving function) may be selected or released through the smart button 438. In the current embodiment, the function selection part 435 and the course selection part 433 may be commonly called an "input part".

Figure 22:
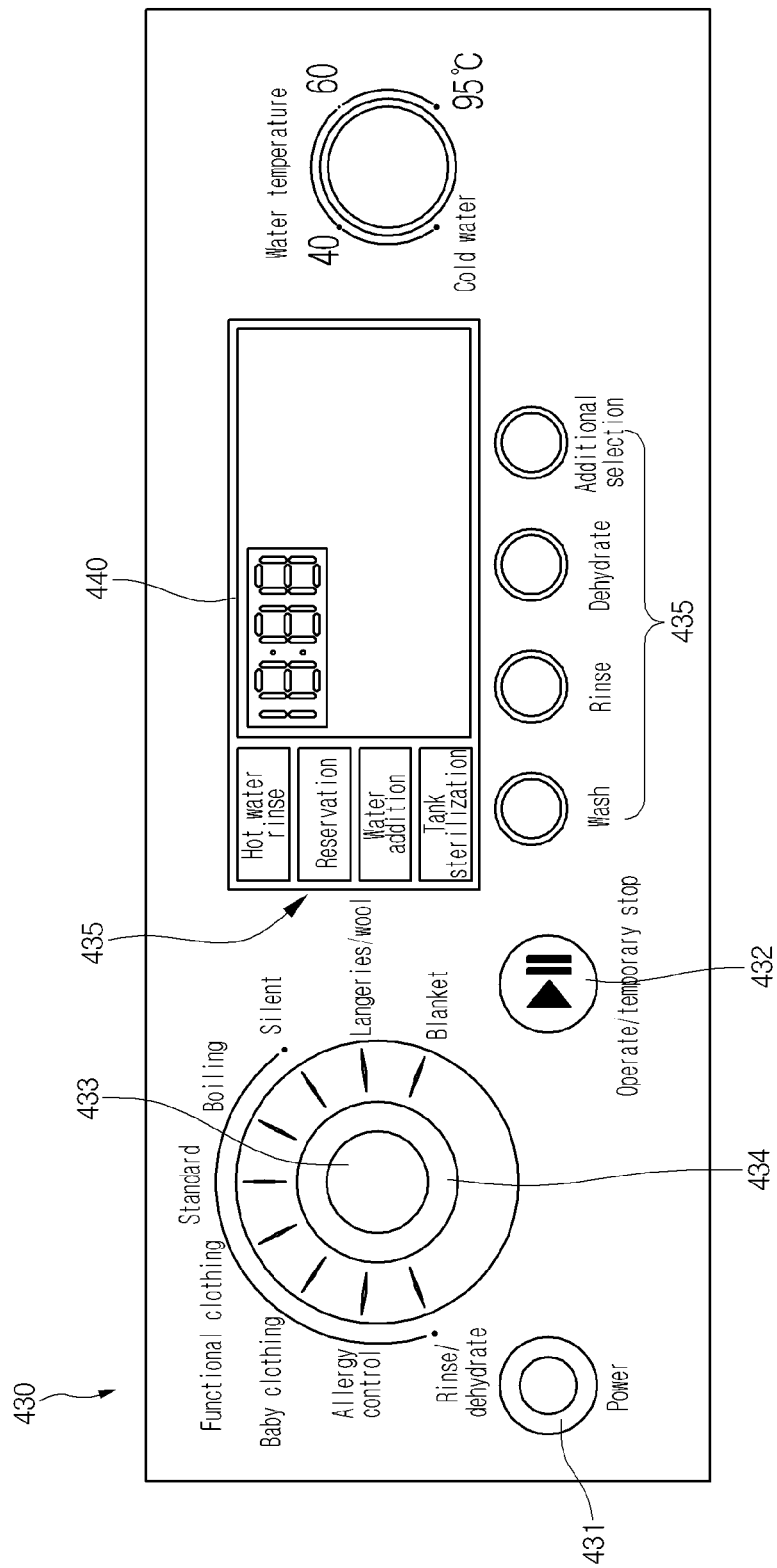
FIG. 22 is a view of a modified example of the control panel of the electrical appliance of FIG. 21.

FIG. 22 is a view of a modified example of the control panel of the electrical appliance of FIG. 21.

The current embodiment is the same as that of FIG. 21 except that a smart course is selected through the course selection part 433.

Referring to FIG. 22, in the current embodiment, a course selected by the course selection part 433 may include at least smart course.

When the smart course is selected, a smart function which is operated according to a preset course to manage energy (e.g., energy consumption reduction). Here, since the smart course is a course for managing energy, an actually performed course in a state where the smart course is selected may be preset or changed by a user. That is, when the smart course is selected, the washing machine is operated, for example, a standard course to perform an operation for managing energy. For another example, in a case where the smart course is set to perform a strong course, when the smart course is selected, the washing machine is operated in the strong course to perform the operation for managing energy.

According to the current embodiment, since an input part for selecting the smart function is provided, the user may easily select or release the smart function regardless of age of the user. Thus, user's convenience may be improved.

Figure 23:
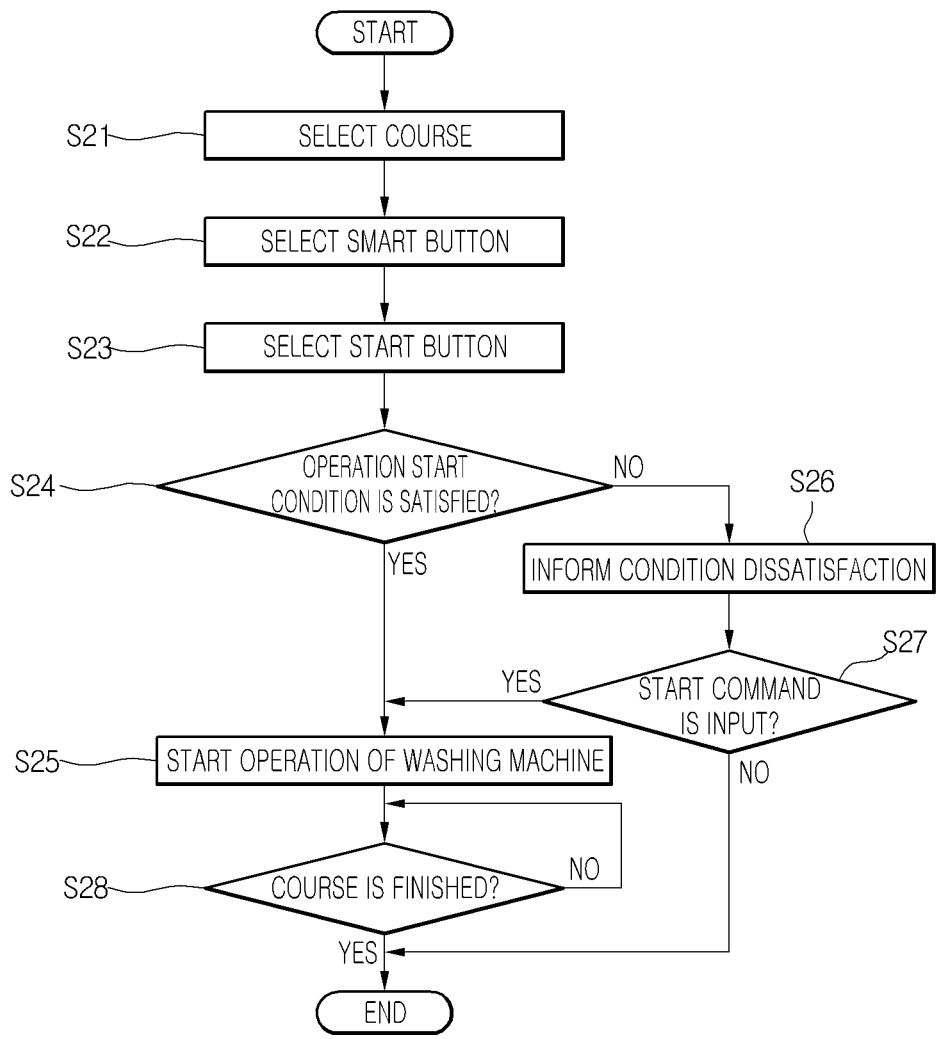
FIG. 23 is a flowchart illustrating a method of controlling the electrical appliance according to the fourth embodiment.

FIG. 23 is a flowchart illustrating a method of controlling the electrical appliance according to the fourth embodiment. Hereinafter, a method of controlling a washing machine which is an example of an electrical appliance will be described.

Referring to FIG. 23, a specific course is selected by the course selection part 433 to operate the washing machine (S21). Then, the smart button 438 is selected (S22). In the current embodiment, a smart button 438 is selected by a user. Hereinafter, a case in which the smart button 438 is selected will be described as an example. The smart button 438 may be selected before or after a course is selected.

Then, the start button 432 is selected (S23). When the start button 432 is selected, a control part (not shown) determines whether an operation start condition of the washing machine is satisfied (S24). In detail, when the start button 432 is selected, the control part of the washing machine determines an estimated time of the selected course. Then, the control part determines whether the sum of the estimated time and an error time overlaps a high price time period. That is, when the washing machine is operated for the sum time, the control part determines whether the high price time period arrives.

In the current embodiment, the estimated time may be varied according to a water supply pressure or laundry addition when the washing machine is actually operated. Thus, the control part determines whether the sum time adding the error time to the estimated time corresponds to the high price time period. When it is determined that the sum time of the estimated time and the error time corresponds to the high price time period, the operation time of the washing machine may overlap the high price time period to prevent a charge from being increased. Thus, reliability of the product may be improved.

If the operation time condition of the washing machine is satisfied, the washing machine is operated according to the selected course (S25). Also, whether the course is finished during the operation of the washing machine is determined (S28). When the course is finished, the operation of the washing machine is stopped.

When the operation start condition is not satisfied according to the result determined in operation S24, a message for informing whether the condition is not satisfied is displayed on the display part 440 (S26). Also, a message for confirming whether the operation of the washing machine start now is displayed on the display part 440.

Then, the control part determines whether a start command is inputted (S27). If the start command is inputted, an operation of the washing machine starts (S25). On the other hand, if the start command is not inputted, the washing machine is standby in a state where the operation of the washing machine is stopped.

In the current embodiment, when the operation start condition is not satisfied, the dissatisfaction information is informed to the user. Thus, the user may easily confirm possibility of the washing to improve user's convenience. Also, since the user determines again whether the operation start condition is satisfied, the washing machine may be user-centrically operated.

Although the smart button is selected in the above-described embodiment, the present disclosure is not limited thereto. For example, when the smart course is selected, and the start button is selected, the following processes of the operation S24 may be equally performed.

Figure 24:
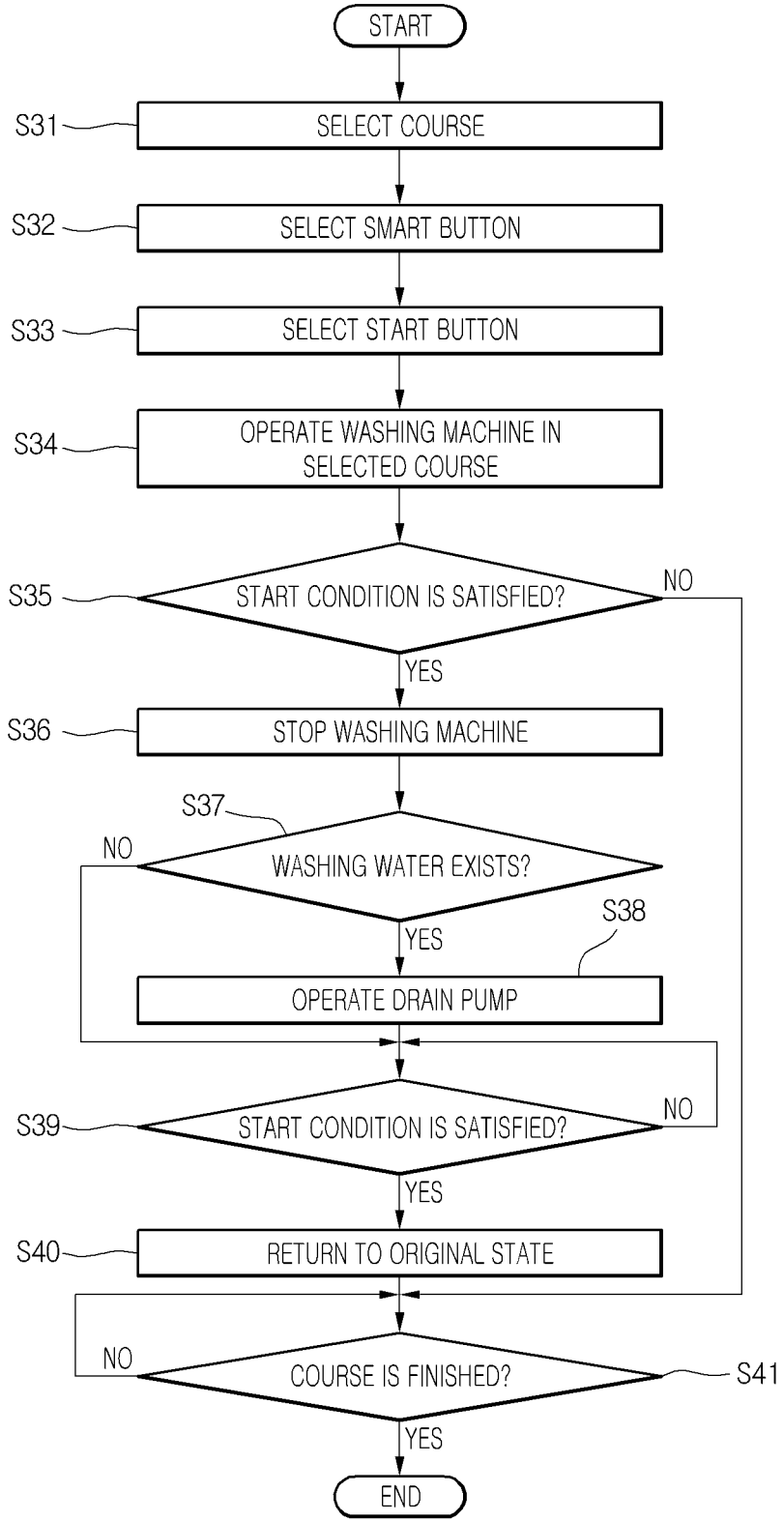
FIG. 24 is a flowchart illustrating a method of controlling an electrical appliance according to a fifth embodiment.

FIG. 24 is a flowchart illustrating a method of controlling an electrical appliance according to a fifth embodiment. Hereinafter, a method of controlling a washing machine which is an example of an electrical appliance will be described.

Referring to FIG. 24, a specific course is selected by the course selection part 433 to operate the washing machine (S31). Then, the smart button is selected (S32). Then, the start button 432 is selected (S33). When the start button 432 is selected, an operation of the washing machine starts (S34). During the operation of the washing machine, the control part determines whether a stop condition is satisfied (S35).

The case in which the strop condition is satisfied may include a case in which a high price period is recognized, a case in which an energy consumption amount (an energy consumption amount of an electrical appliance, the whole utility for home, and an energy consumption component) greater than a reference amount is recognized, and a case in which an abnormal state (an abnormal operation state) is recognized.

If it is determined that the stop condition is satisfied, an operation of the washing machine is stopped (S36). Then, the control part determines whether washing water exists in the washing machine (S37). Here, in the current embodiment, the existence of the washing water represents that the washing water as need to be drained exists. When it is determined that the washing water exists in the washing machine, a drain pump is operated to drain the washing water (S38). In the current embodiment, the reason in which the drain pump is operated is for preventing laundry from being damaged or small from occurring due to the existence of the washing water for a long time. Then, the control part determines whether an operation start condition of the washing machine is satisfied (S39). The case in which the operation start condition is satisfied may includes a case in which a low price period is recognized and a case in which the current or accumulated energy consumption amount of at least one utility for home or at least one energy consumption component less than a reference amount is recognized.

When the operation start condition is satisfied, the washing machine returns to an original operation state thereof (S40). Also, whether the course is finished during the operation of the washing machine is determined (S41). When the course is finished, the operation of the washing machine is stopped.

Although the washing machine returns to the original state thereof when the start condition is satisfied, the present disclosure is not limited thereto. For example, the washing machine may be continuously maintained in the stopped state thereof without determining whether the start condition is satisfied.

Figure 25:
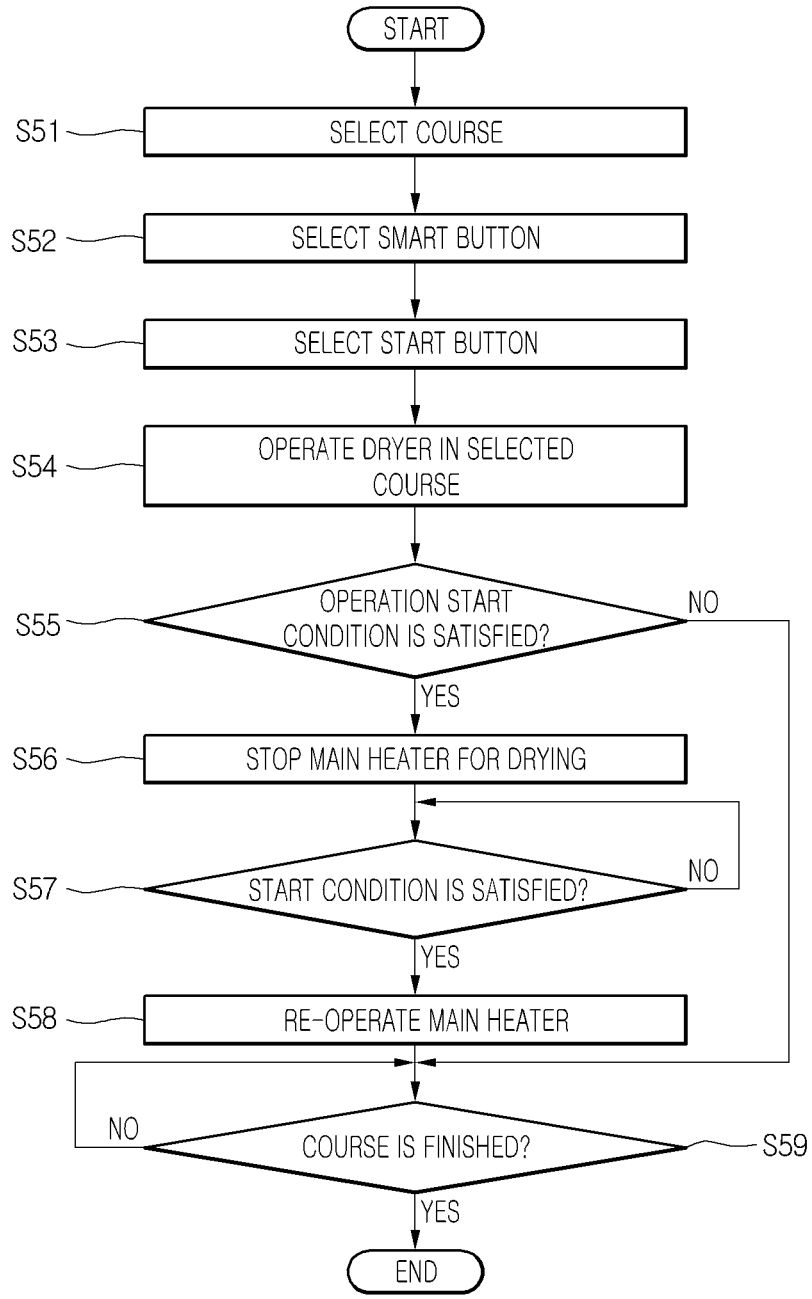
FIG. 25 is a flowchart illustrating a method of controlling an electrical appliance according to a sixth embodiment.

FIG. 25 is a flowchart illustrating a method of controlling an electrical appliance according to a sixth embodiment. Hereinafter, a method of controlling a dryer which is an example of an electrical appliance will be described.

Referring to FIG. 25, a specific course is selected by the course selection part 433 to operate the dryer (S51). Then, the smart button is selected (S52). Then, the start button 432 is selected (S53). When the start button 432 is selected, an operation of the dryer starts (S54). During the operation of the dryer, the control part determines whether a stop condition is satisfied (S55).

The case in which the strop condition is satisfied may include a case in which a high price period is recognized, a case in which an energy consumption amount (an energy consumption amount of an electrical appliance, the whole utility for home, and an energy consumption component) greater than a reference amount is recognized, and a case in which an abnormal state (an abnormal operation state) is recognized.

If it is determined that the stop condition is satisfied, an operation of a main heater for drying and constituting the dryer is stopped (S56). Then, the control part determines whether an operation start condition of the dryer is satisfied (S57).

The case in which the operation start condition is satisfied may includes a case in which a low price period is recognized and a case in which the current or accumulated energy consumption amount of at least one utility for home or at least one energy consumption component less than a reference amount is recognized.

When the operation start condition is satisfied, the main heater is re-operated (S58). Also, whether the course is finished during the operation of the dryer is determined (S59). When the course is finished, the operation of the dryer is stopped.

Although the main heater is re-operated when the start condition is satisfied, the present disclosure is not limited thereto. For example, the dryer may be continuously maintained in the stopped state thereof without determining whether the start condition is satisfied.

Figure 26:
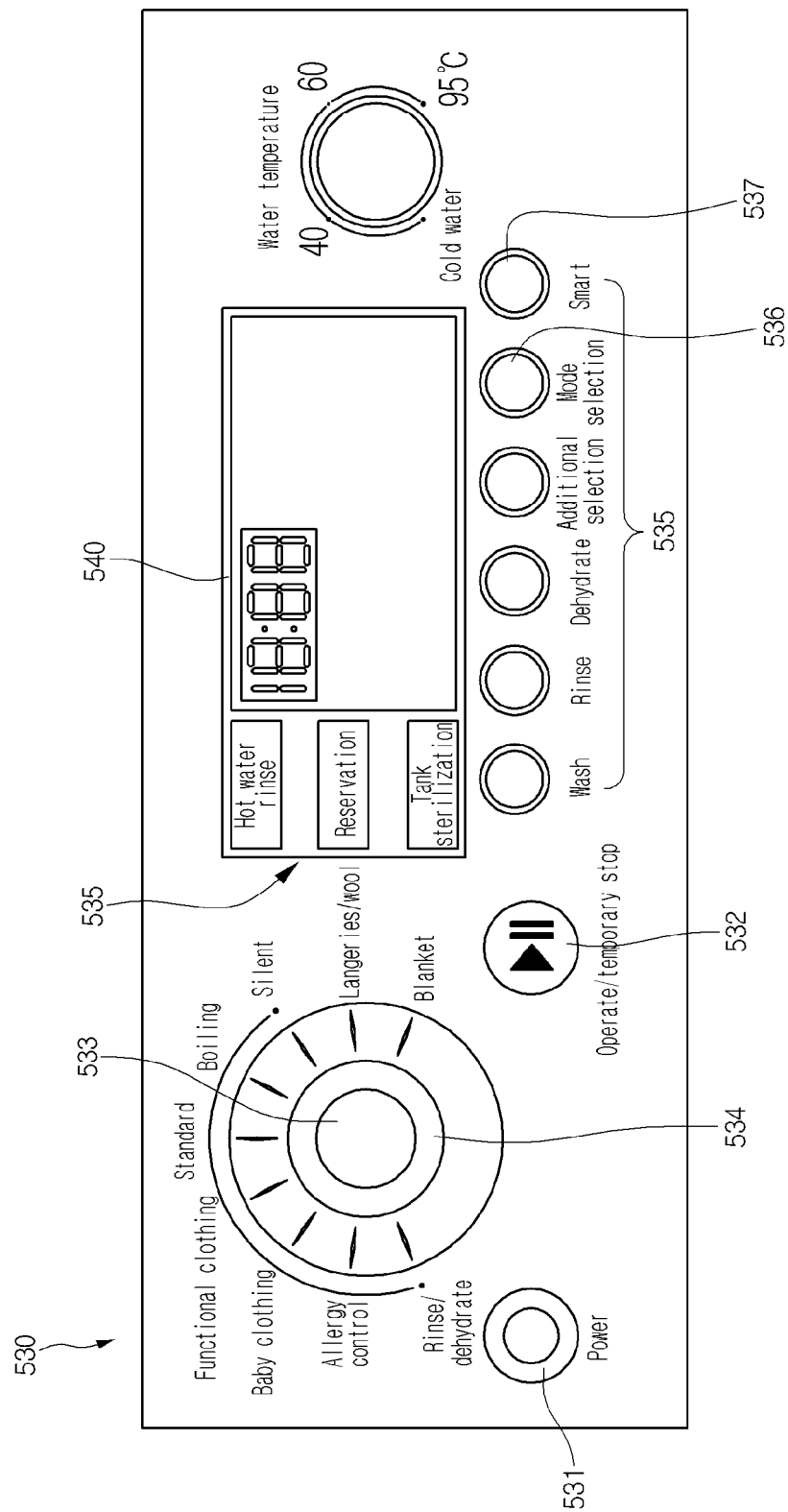
FIG. 26 is a view illustrating a control panel of an electrical appliance according to a seventh embodiment.

FIG. 26 is a view illustrating a control panel of an electrical appliance according to a seventh embodiment. Hereinafter, a control panel of the washing machine which is an example of an electrical appliance will be described.

Referring to FIG. 26, a control panel 530 of a washing machine may include a power button 531 for turning the washing machine on/off, an operation button 532 for starting or temporally stopping an operation of the washing machine or re-operating the washing machine, a course or mode selection part 533 (hereinafter, referred to as a "course selection part") for selecting an operation course or mode, a function selection part 535 including a plurality of buttons to select a function desired by a user, and a display part 540 for displaying an selected item, the progress of a corresponding course (mode), and a remaining time when the function selection part 535 is manipulated. The course selection part 535 may be rotated, for example, together with a knob. The function selection part 535 includes a mode selection button 536 for selecting an operation mode in at least selected course and a smart button 537 for selecting a smart function.

When a specific course is selected, the washing machine may be operated in one mode of the plurality of operation modes. The plurality of operation modes may include a normal mode, a time reduction mode, and a power saving mode. The plurality of operation modes may be classified by at leas one of a required time, an energy charge, and an energy consumption amount in each mode.

The normal mode may be preset when the electrical appliance is produced. A method of operating a component constituting the electrical appliance in the normal mode may be varied. The normal mode and the time reduction mode represent a mode in which the washing machine (component) is operated without being based on energy information.

In the time reduction mode, a course finish time is less than that of the normal mode. In this instance, the energy usage charge (or energy consumption) in the time reduction mode may be equal to or greater than the energy usage charge (or energy consumption) in the normal mode. The energy usage charge (or energy consumption amount) in the time reduction mode may be changed by varying the operation method of the component.

In the power saving mode, the course finish time is greater than that of the normal mode. However, the energy usage charge (or energy consumption) in the power saving mode may be less than the energy usage charge (or energy consumption) in the normal mode. The course finish time in the time reduction mode and the power saving mode may be manually changed. Thus, the energy charge in the time reduction mode and the power saving mode may be changed also. Also, performance (e.g., washing performance or cooking performance) of the products in the normal mode, the time reduction mode, and the power saving mode may be identical or similar to one another.

A function for automatically converting the operation mode according to energy information by using the smart button 537 may be selected. That is, when the smart function is selected using the smart button 537, the operation mode may be automatically selected or converted according to the energy information.

For example, when the course start time point corresponds to a high price time period, the power saving mode may be selected. On the other hand, when the course start time point corresponds to a low price time period, the time reduction mode or the normal mode may be selected. For another example, while the low price time period is recognized to perform the time reduction mode or the normal mode, when the high price time period is recognized, the time reduction mode or the normal mode may be converted into the power saving mode.

On the other hand, when the smart function is released, a user may select or vary the operation mode by using the mode selection button 536.

Information related to energy may be displayed on the display part 540. That is, the current energy charge may be displayed. Also, the user may confirm the displayed energy charge information to select one mode of the plurality of operation modes.

In the current embodiment, the operation mode may be selected before or after a course is selected. For example, when the user selects a standard course in a state where the smart function is released, a screen for selecting the operation mode may be displayed on the display part 540. Thus, the user may select a specific operation mode by using the mode selection button. For another example, in the state where the smart function is released, the user may select the specific operation mode by using the mode selection button. Then, a specific course may be selected, and a start button may be selected.

Here, when the start button is selected in a state where the user does not select the specific operation mode before the course is selected, a message for informing whether the operation mode is selected may be displayed on the display part, or the operation mode selected when the prior course is performed may be automatically selected.

Figure 27:
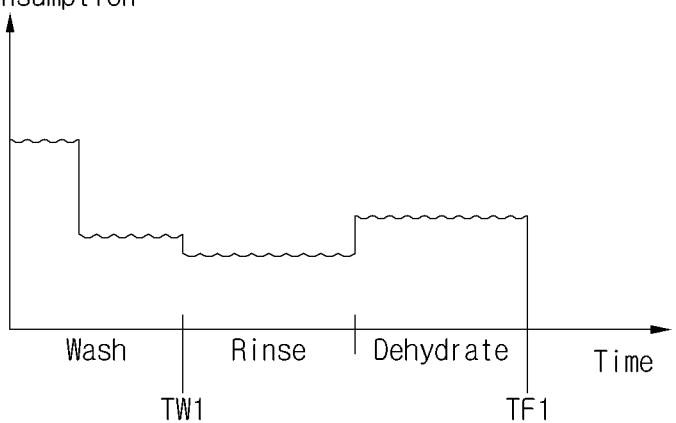
FIG. 27 is a graph for comparing power consumption and operation time according to a plurality of operation modes.
Figure 27:
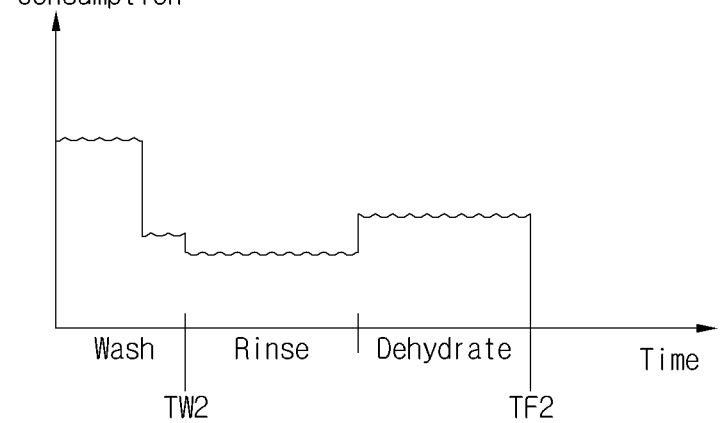
Figure 27:
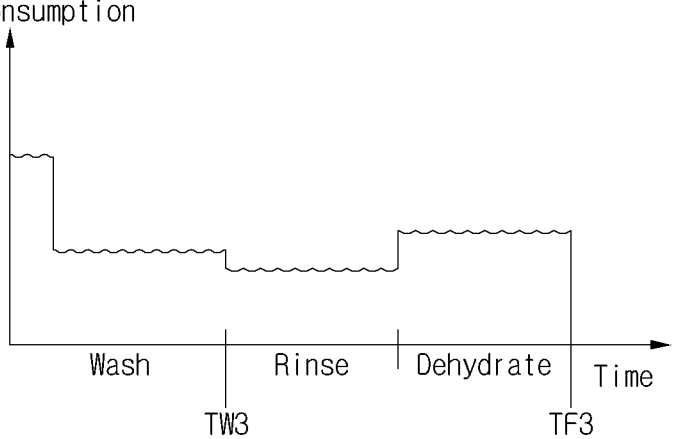

FIG. 27 is a graph for comparing power consumption and operation time according to a plurality of operation modes. FIG. 27A illustrates power consumption and an operation time in the normal mode, FIG. 27B illustrate the power consumption and the operation time in the time reduction mode, and FIG. 27C illustrates the power consumption and the operation time in the power saving mode.

Referring to FIG. 27, the same or different kind of components may be simultaneously or sequentially operated in a portion of each course or the whole course period. Alternatively, a single energy consumption component may be operated in a portion of the whole course period.

Hereinafter, a washing machine will be described as an example. In case of the washing machine, a heater (a first consumption component) may be operated, and then a motor (a second consumption component) for rotating a drum may be operated in a washing cycle. Here, the heater may have power consumption greater than that of the motor. Alternatively, the motor may be operated in a dehydration cycle.

An operation time of the heater having relatively high power consumption may be increased in the time reduction mode when compared to that in the normal mode. Also, an operation time of the motor may be decreased in the time reduction mode when compared to that in the normal mode. Thus, a required time TW2 for the washing cycle in the time reduction mode may be less than a required time TW1 for the washing cycle in the normal mode. Thus, a required time TF2 for the course in the time reduction mode may be less than a required time TF1 for the course in the normal mode.

On the other hand, the operation time of the heater having relatively high power consumption may be decreased in the power saving mode when compared to that in the normal mode. Also, the operation time of the motor may be increased in the power saving mode when compared to that in the normal mode. Thus, a required time TW3 for the washing cycle in the power saving mode may be greater than the required time TW1 for the washing cycle in the normal mode. Thus, a required time TF3 for course in the power saving mode may be greater than the required time TF1 for course in the normal mode.

For another example, an RPM (a mean RPM or maximum RPM) of the motor in the time reduction mode during the dehydration cycle may be greater than that of the motor in the normal mode. Thus, a required time for the dehydration cycle in the time reduction mode may be less than that for the dehydration cycle in the normal mode. On the other hand, an RPM of the motor in the power saving mode during the dehydration cycle is less than that of the motor in the normal mode. Thus, a required time for the dehydration cycle in the power saving mode may be greater than that for the dehydration cycle in the normal mode.

Although the operation method of the component for each mode is different in a portion of the whole course period, the present disclosure is not limited thereto. For example, the operation method of the component for each mode may be different in a plurality of periods of the whole course period.

Also, although the operation mode is selected in the energy consumption component (e.g., the electrical appliance), the present disclosure is not limited thereto. For example, the operation mode may be selected in the other energy consumption component except for a specific energy consumption component or the other component, and then information related to the selected mode may be transmitted into the specific energy consumption component.

Figure 28:
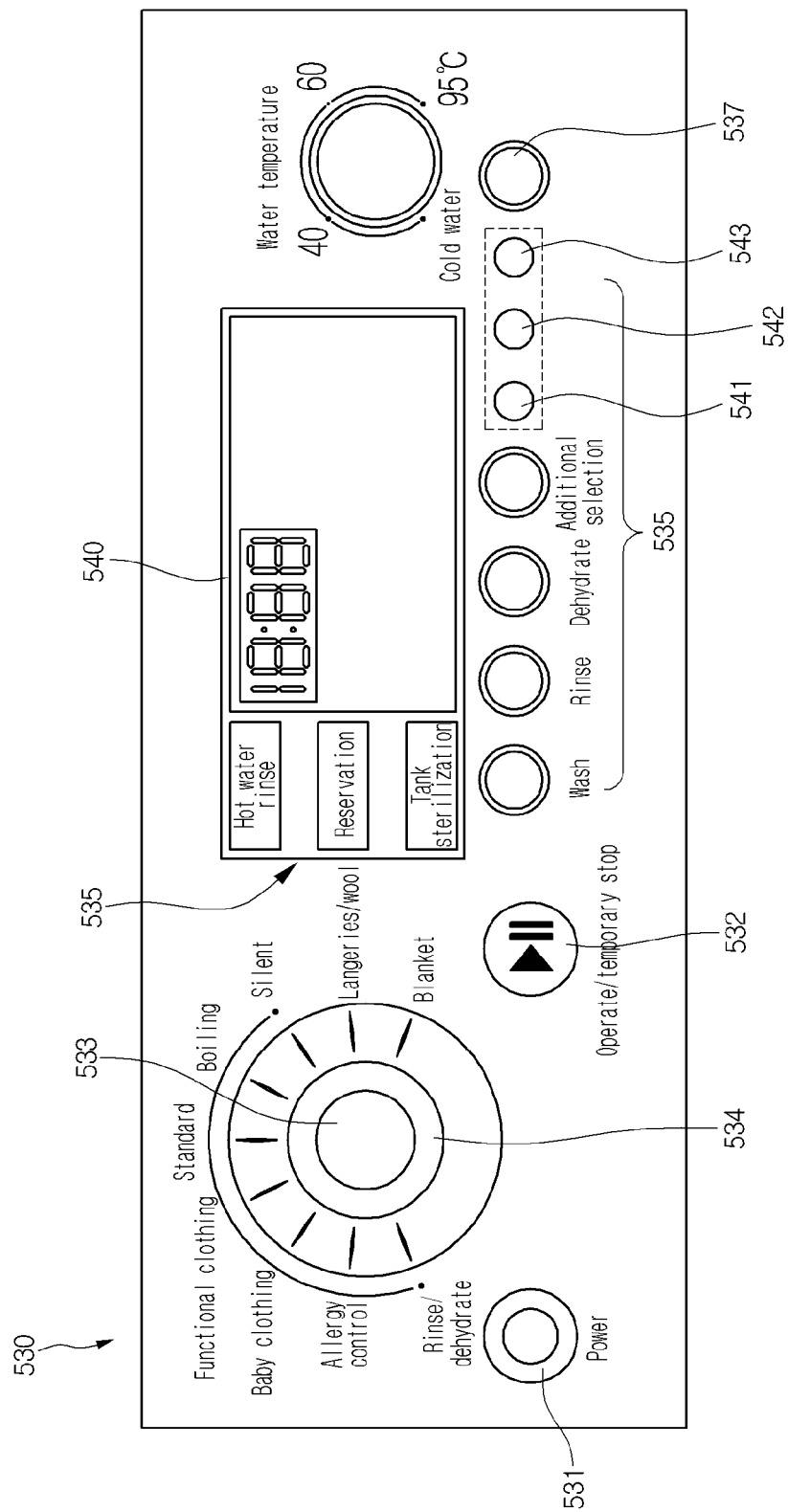
FIG. 28 is a view of a modified example of the control panel of the electrical appliance of FIG. 26.
Figure 29:
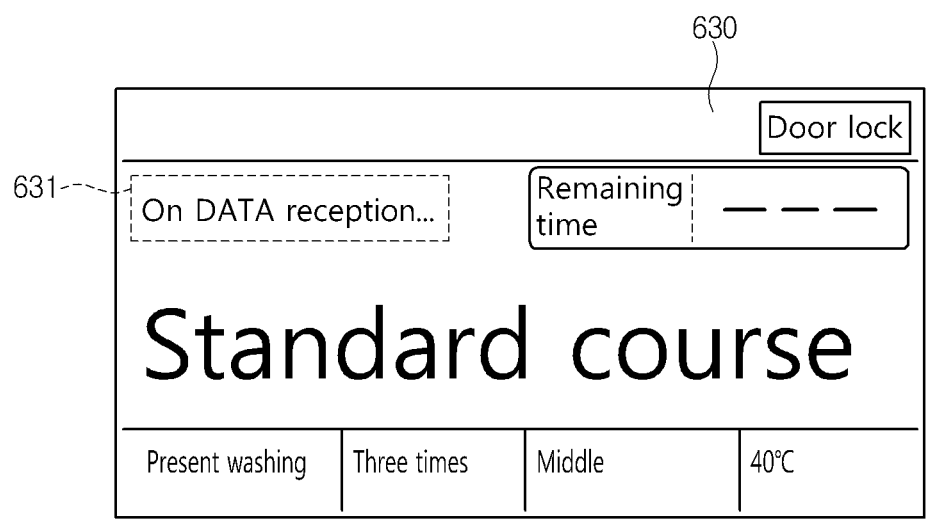
FIGS. 29 to 33 are views illustrating a screen displayed on a display part of a component according to an eighth embodiment.
Figure 30:
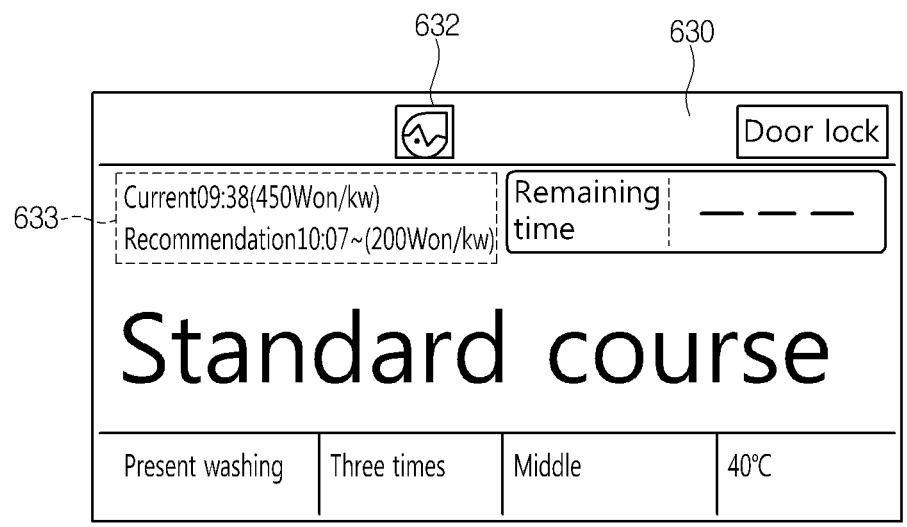
Figure 31:
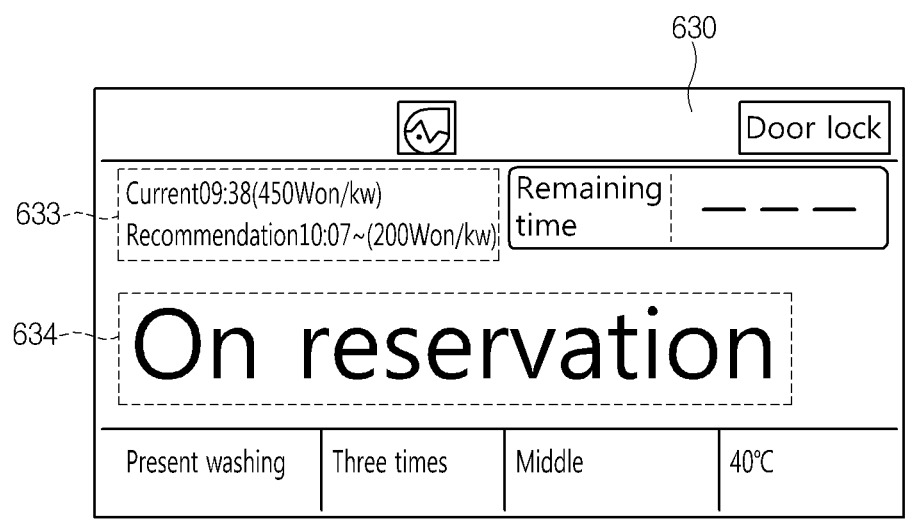
Figure 32:
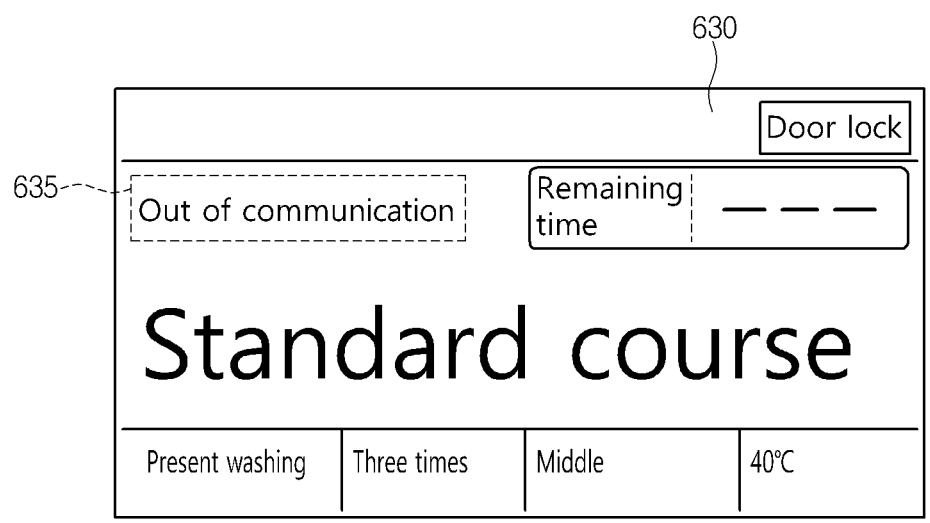
Figure 33:
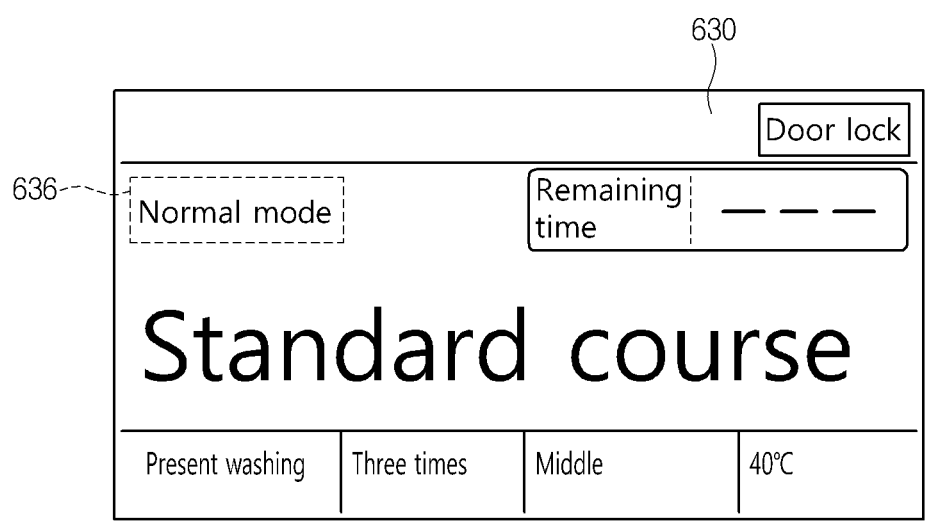

FIG. 28 is a view of a modified example of the control panel of the electrical appliance of FIG. 26.

Referring to FIG. 28, the current embodiment is equal to that of FIG. 28 except that mode selection buttons having number corresponding to that of a plurality of operation modes are provided. That is, in the current embodiment, a control panel includes a first button 541 (a normal mode selection part) for selecting a normal mode, a second button 542 (a time reduction mode selection part) for selecting a time reduction mode, and a third button 543 (a power saving mode selection part) for selecting a power saving mode.

Figure 34:
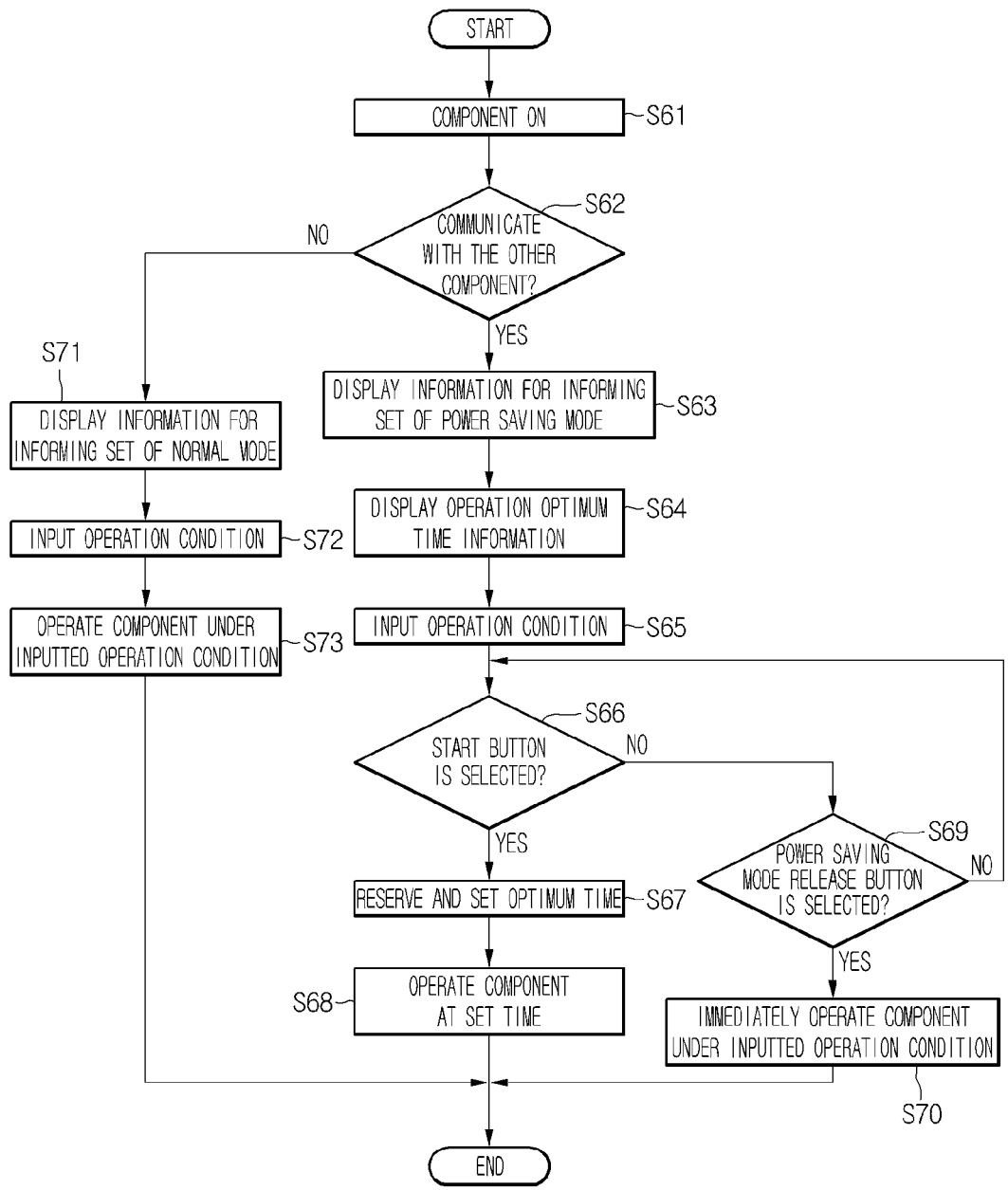
FIG. 34 is a flowchart illustrating a method of controlling the component according to the eighth embodiment.

FIGS. 29 to 33 are views illustrating a screen displayed on a display part of a component according to an eighth embodiment. FIG. 34 is a flowchart illustrating a method of controlling the component according to the eighth embodiment.

Referring to FIGS. 29 to 34, a component is turned on to operate the component (S61). When the component is turned on, a display part 630 is activated.

When the component is turned on, a communication unit of the component attempts to communicate with the other component. While the communication unit attempts to communicate with the other component (i.e., when the component communicates with the other component), information (see reference numeral 631 of FIG. 29) for informing attempting of communication may be displayed on the display part 630. For example, the information for informing the attempting of communication may be a "on DATA reception".

It is determined whether the communication unit successfully communicates with the other component during the attempting of communication (S62). For example, standards for determining the successful communication may be the number of communication attempt, a communication attempt time, and a communication intensity. If the communication unit successfully communicates with the other component, a power saving mode is set. That is, the component may perform a power saving function. When the communication unit successfully communicates with the other component, information (see reference numeral 632 of FIG. 30) for informing a set of a power saving mode is displayed on the display part 630 (S63). For example, the information for informing the set of the power saving mode may be an icon. However, a kind of information (see reference numeral 632 of FIG. 30) is not limited. For example, the information may include at least one of various information such as symbols, characters, and the like.

For another example, while the communication unit attempts to communicate with the other component, information (see reference numeral 632 of FIG. 30) for informing the set of the power saving mode may be displayed. Here, when the communication unit successfully communicates with the other component, light may be emitted from a light emitting part as information (see reference numeral 632 of FIG. 30) for informing the set of the power saving mode.

When the communication unit successfully communicates with the other component, time information and energy charge information (e.g., electricity charge information) may be displayed on the display part 630 (S64). For example, current time information and current electricity charge information may be displayed on the display part 630. For another example, the current time information, the current electricity charge information, an inexpensive electricity charge time (which may be called an optimum time, a power saving time, or a recommendation time) within a time range from the current time to a predetermined time, and an electricity charge information (see reference numeral 633 of FIG. 30) at the inexpensive electricity charge time may be displayed on the display part 630.

Here, the electricity charge information may be a charge information per unit power. For example, the predetermined time may be about 6 hours. The predetermined time may be manually set and changed or automatically set or changed. For example, the predetermined time may be automatically set or changed according to season. In the current embodiment, a reason in which the inexpensive electricity charge time within a range from the current time to the predetermined time is displayed is because there is a long time from the current time to the inexpensive electricity charge time when the inexpensive electricity charge time is displayed without a time limit.

Then, an operation condition of the component may be inputted (S65). The operation condition of the component may be inputted at any time point after the component is turned on. The operation condition may be, for example, an operation course which should be performed by the component. When the operation condition is inputted, the inputted operation condition (for example, the standard course in FIG. 30) may be displayed on the display part 630. After the operation condition of the component is inputted, it is determined whether the start button is selected (S66). When it is determined that the start button is selected, reservation is set so that the component is operated at the optimum time displayed on the display part (67). Also, information (see reference numeral 634 of FIG. 31 or information for informing that the component is operated after the current time) for informing the set of the reservation may be displayed on the display part 630. The information of informing the set of the reservation may be, for example, "on reservation". Also, the component is operated at the reserved optimum time (S68). That is, the component may be operated to satisfy the optimum time. For example, when the current time and the optimum time are the same, the component may be immediately operated. As shown in FIG. 12, when the current time and the recommendation time are different from each other, the component may be operated at the recommendation time after standing by till the recommendation time.

When it is determined that the start button is not selected according to the result determined in the operation S66, it is determined whether a power saving mode release button is selected (S69). That is, it is determined whether a command for releasing the power saving mode is inputted. If the command for releasing the power saving mode is not inputted, the process is returned to the operation S66. On the other hand, when the command for releasing the power saving mode is inputted, the power saving mode is converted into the normal mode. That is, the component performs a normal function. When the power saving mode is converted into the normal mode, information for informing the power saving mode, the time information, and the charge information are disappeared on the display part 630 (see reference numeral 33 of FIG. 30. Also, information (see reference numeral 638 of FIG. 33) for informing the normal mode may be displayed on the display part 630.

Also, when the command for releasing the power saving mode is inputted, the component is immediately operated under the inputted operation conditions (S70). For another example, since the operation time is included in the inputted operation condition, the component may be immediately operated or be operated at a time inputted by the user.

In the result determined in the operation S72, when the communication unit does not communicate with the other component (out of communication), the normal mode is set. That is, the component performs a normal function. Also, information (see reference numeral 635 of FIG. 32) for informing the set of the normal mode may be displayed on the display part S71. For example, the information (see reference numeral 635 of FIG. 32) for informing the set of the normal mode may be the "out of communication".

In the current embodiment, the normal mode may include a case in which the communication is impossible and a case in which the power saving mode is converted into the normal mode. Thus, to classify the two cases, different information may be displayed on the display part in each of the two cases. For another example, any information may not be displayed in the case in which the power saving mode is converted into the normal mode. However, the information for informing the out of communication may be displayed only in case in which the communication is impossible.

Then, after the normal mode is set, the operation condition of the component may be inputted (S72). As described above, the operation condition of the component may be inputted at any time point after the component is turned on. Also, when the operation condition of the component is inputted, the component is operated under the inputted operation condition (S73).

Figure 35:
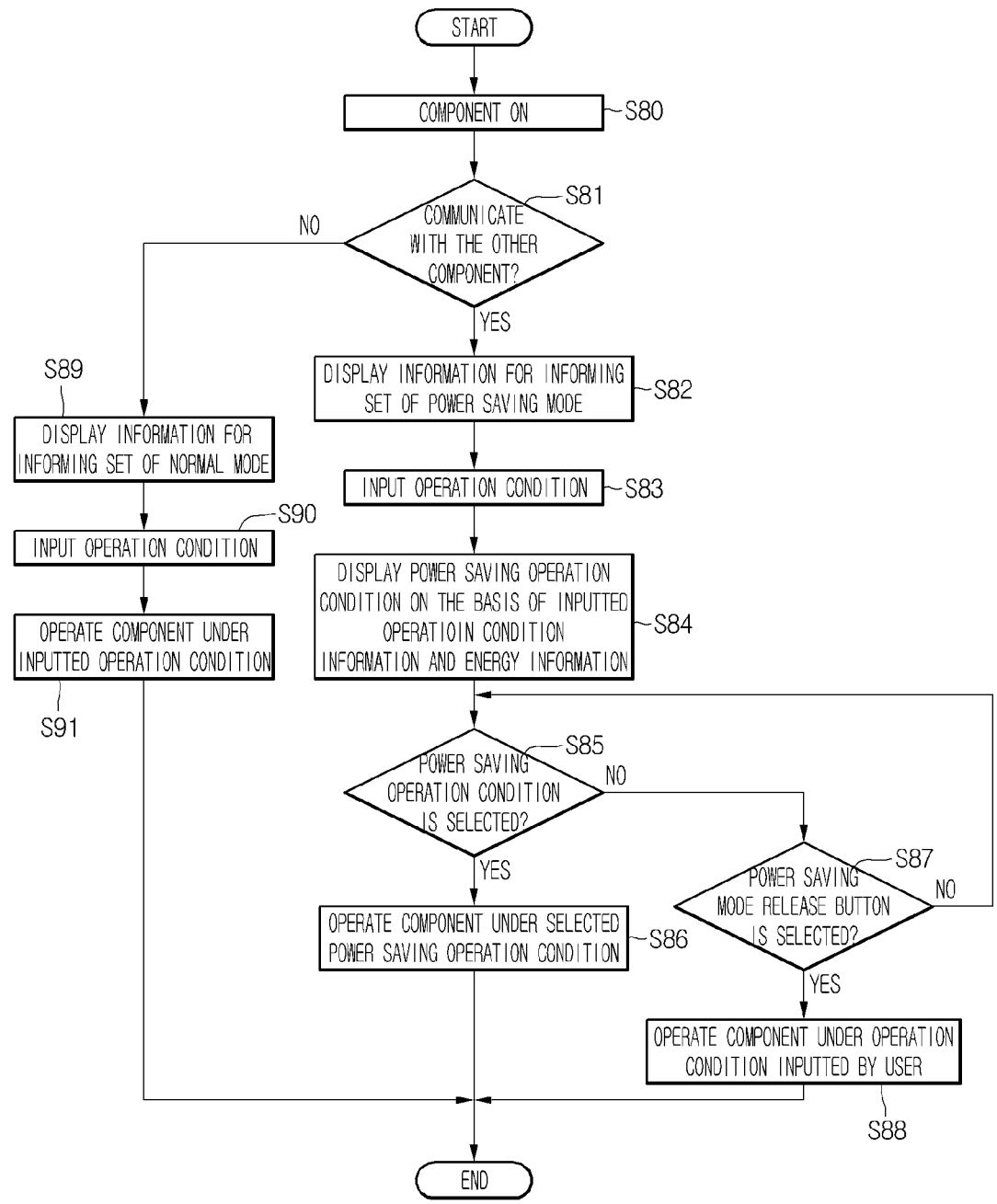
FIG. 35 is a flowchart illustrating a method of controlling a component according to a ninth embodiment.

FIG. 35 is a flowchart illustrating a method of controlling a component according to a ninth embodiment.

Referring to FIG. 35, a component is turned on to operate the component (S80). When the component is turned on, a display part may be activated.

When the component is turned on, a communication unit of the component attempts to communicate with the other component. While the communication unit attempts to communicate with the other component, information for informing the attempting of the communication may be displayed on the display part. It is determined whether the communication unit successfully communicates with the other component during the attempting of communication (S81). For example, standards for determining the successful communication may be the number of communication attempt, a communication attempt time, and a communication intensity.

If the communication unit successfully communicates with the other component, the power saving mode is set. That is, the component may perform a power saving function. When the communication unit successfully communicates with the other component, information for informing the set of the power saving mode is displayed on the display part (S82). For example, the information for informing the set of the power saving mode may be an icon. However, a kind of information is not limited. For example, the information may include at least one of various information such as symbols, characters, and the like.

For another example, while the communication unit attempts to communicate with the other component, information for informing the set of the power saving mode may be displayed. Here, when the communication unit successfully communicates with the other component, light may be emitted from a light emitting part as information for informing the set of the power saving mode.

Then, an operation condition of the component may be inputted (S83). The operation condition of the component may be inputted at any time point after the component is turned on. When the operation condition is inputted, a power saving operation condition is determined on the basis of the inputted operation condition and the energy information and then is recommended to the user. That is, the power saving operation condition may be displayed on the display part (S84).

For example, in a case where the inputted operation condition is time information related to the operation of the component, an operation time (a power saving time) of the component in which at least power saving is possible may be recommended on the basis of the energy information and the inputted time information. Here, the recommended operation time may be equal to the inputted time or a time changed from the inputted time. Also, the recommended operation time may include an operation start time or an operation end time. Alternatively, in a case where the operate time is in a predetermined time range, an operation time within the predetermined time range may be recommended. Also, when the user selects the recommended power saving time, the component may be operated to satisfy the power saving time.

For another example, in a case where the inputted operation condition is a driving method (e.g., a course) of the component, the driving method of the component in which at least power saving is possible may be recommended on the basis of the energy information and the inputted driving method. Here, the recommended driving method may be equal to the inputted driving method or a driving method changed from the inputted driving method.

For another example, in a case where the inputted operation condition is an energy charge or energy usage amount of the component, the driving method and/or time of the component may be recommended to satisfy a value less than that of the energy charge or energy usage amount which is inputted on the basis of the energy information and the inputted information.

Then, it is determined whether the user selects the recommended operation condition (S85). If it is determined that the recommended power saving operation condition is selected, the component is operated under the selected power saving operation condition (S86).

On the other hand, the result determined in the operation S85, when it is determined that the power saving operation condition is not selected, it is determined whether the power saving mode release button is selected (S87). That is, it is determined whether a command for releasing the power saving mode is inputted. If the command for releasing the power saving mode is not inputted, the process is returned to the operation S85. On the other hand, when the command for releasing the power saving mode is inputted, the component is operated under the inputted operation conditions (S88).

In the result determined in the operation S81, when the communication unit does not communicate with the other component (out of communication), the normal mode is set. That is, the component performs a normal function. Also, information for informing the set of the normal mode may be displayed on the display part (S89). For example, the information for informing the setting of the normal mode be the "out of communication".

Then, after the normal mode is set, the operation condition of the component may be inputted (S90). As described above, the operation condition of the component may be inputted at any time point after the component is turned on. Also, when the operation condition of the component is inputted, the component is operated under the inputted operation condition (S91).

According to the current embodiment, the operation condition for saving a power may be recommended to the user by comparing the inputted operation condition to the energy information. When the user selects the power saving operation condition, the component may be operated in the power saving mode to reduce the electricity charge in the aspect of the user.

Also, in a case where the component is the energy management component except for the energy consumption component, the power saving mode of the energy management component represents a control mode for saving a power of the energy consumption component.

Also, although the power saving mode is set in the case where the communication unit is communicable with the other component in the above-described embodiments, the present disclosure is not limited thereto. For example, when the normal mode is set regardless of the communication, and the power saving mode selection command is inputted (for example, the power saving mode selection button is selected), the power saving mode may be set. For another example, the power saving mode may be set in the high price period, and the normal mode may be set in the low price period.

According to the proposed embodiments, the energy source may be effectively managed.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A first electrical appliance capable of communicating with a network system, the first electrical appliance comprising:
    a communication unit to communicate with a second electrical appliance;
    an interface to receive a command related to an operation of the first electrical appliance;
    a display part; and
    a control unit to control the operation of the first electrical appliance based on the command,
    wherein the first electrical appliance comprises a power saving function in which the first electrical appliance is operable on the basis of information related to energy,
    wherein the control unit is arranged to:
    determine whether the communication unit communicates with the second electrical appliance,
    when the communication unit is not in communication with the second electrical appliance, set a normal function of the first electrical appliance,
    when the communication unit communicates with the second electrical appliance, set the power saving function,
    when the power saving function is set, input operation condition of the first electrical appliance,
    wherein the operation condition of the first electrical appliance includes time information related to the operation of the first electrical appliance, a driving method of the first electrical appliance, an energy charge or energy usage amount of the first electrical appliance,
    when the operation condition is inputted, recommend a power saving operation condition on the basis of the inputted operation condition and the information related to energy,
    wherein the recommended power saving operation condition includes an operation time of the first electrical appliance in which at least power saving is possible, on the basis of the energy information and the inputted time information,
    a driving method of the first electrical appliance in which at least power saving is possible, on the basis of the energy information and the inputted driving method,
    a driving method or time of the first electrical appliance to satisfy a value less than that of the energy charge or energy usage amount which is inputted on the basis of the energy information and the inputted information, and
    wherein when the recommended power saving operation condition is selected, cause the first electrical appliance to be operated under the selected power saving operation condition.

2. The first electrical appliance according to claim 1, wherein the interface comprises at least one of an input part or is included in the display part.

3. The first electrical appliance according to claim 1, wherein the normal function is one in which the first electrical appliance is operable without being based on the information related to energy.

4. The first electrical appliance according to claim 3, wherein the interface comprises a selection part to select the power saving function or the normal function.

5. The first electrical appliance according to claim 4, wherein one function of the power saving function and the normal function is changed into another function by a selection of the selection part at the interface.

6. The first electrical appliance according to claim 4, wherein the selection part comprises a power saving function selection part to select the power saving function and a normal function selection part to select the normal function.

7. The first electrical appliance according to claim 3, wherein an energy usage amount or energy charge when the first electrical appliance is operated in a specific course in a state where the power saving function is set is less than that when the first electrical appliance is operated in the specific course in a state where the normal function is set.

8. The first electrical appliance according to claim 3, wherein the first electrical appliance further comprises a time reduction function in which the first electrical appliance is operated without being based on the information related to energy, and an operation time of the first electrical appliance is reduced when compared to that of an operation time during the normal function.

9. The first electrical appliance according to claim 1, wherein, in the state where the power saving function is set, the control unit causes time information and energy charge information to be displayed on the display part.

10. The first electrical appliance according to claim 9, wherein the control unit causes total energy charge, when the first electrical appliance is operated in a specific course at a current time point, to be displayed on the display part.

11. The first electrical appliance according to claim 9, wherein the control unit causes a total energy charge, when the first electrical appliance is operated in a specific course within each time period, to be displayed on the display part.

12. The first electrical appliance according to claim 1, wherein the power saving function comprises an automatic power saving function in which an operation method or time of the first electrical appliance is automatically selected by the control unit and a manual power saving function in which the operation method or time of the first electrical appliance is manually selected at the interface, and
    wherein one of the automatic power saving function and manual power saving function is selected by a user selection via the interface.

13. The first electrical appliance according to claim 1, wherein, when a specific course of the first electrical appliance is selected at the interface, and a start button receives an input in a state where the power saving function is set, the control part determines whether an operation start condition is satisfied, and when the operation start condition is satisfied, the first electrical appliance performs the selected specific course.

14. The first electrical appliance according to claim 13, wherein the control unit determines whether the operation start condition is satisfied by determining whether the sum of a required operation time and an error margin time of the selected specific course overlaps a high price period.

15. The first electrical appliance according to claim 13, wherein, when the operation start condition is not satisfied, the control unit causes the operation of the first electrical appliance to be placed on standby to operate at a subsequent time.

16. The first electrical appliance according to claim 1, wherein a power saving driving method for reducing an energy charge or an energy usage amount is recommended by the control unit on the basis of information related to energy and the command received at the interface in a state where the power saving function is set.

17. The first electrical appliance according to claim 16, wherein the control part determines a power saving driving method based on a driving method having a driving time and a course.

18. The first electrical appliance according to claim 16, wherein if time related to an operation of the first electrical appliance is received at the interface, the display part displays a power saving operation time for the first electrical appliance to reduce an energy usage cost based on the received time and the information related to energy.

19. The first electrical appliance of claim 16, wherein if an operation method of the first electrical appliance is received at the interface the display part displays a power saving driving method for the first electrical appliance to reduce an energy usage cost based on the received operation method and the information related to energy.

20. The first electrical appliance of claim 16, wherein if an energy usage cost or an energy usage amount of the first electrical appliance is received at the interface, the display part displays a driving method for the first electrical appliance based on the information related to energy and the received energy usage cost or the energy usage amount of the first electrical appliance so as to result in an energy usage cost or an energy usage amount lower than the received energy usage cost or energy usage amount.

21. The first electrical appliance of claim 1, wherein the information related to energy comprises a high price time period, and when the high price time period is included within at least one portion of a driving time period of the first component, the control unit causes the driving time period of the first electrical appliance to be changed.

* * * * *